(12) United States Patent
Chen et al.

(10) Patent No.: US 12,294,428 B2
(45) Date of Patent: May 6, 2025

(54) CODEBOOK CONFIGURATION METHOD, PORT CONFIGURATION METHOD, AND DEVICE

(71) Applicant: ZTE CORPORATION, Shenzhen (CN)

(72) Inventors: Yijian Chen, Shenzhen (CN); Yu Ngok Li, Shenzhen (CN); Hao Wu, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 149 days.

(21) Appl. No.: 18/093,371

(22) Filed: Jan. 5, 2023

(65) Prior Publication Data

US 2023/0142160 A1 May 11, 2023

Related U.S. Application Data

(63) Continuation of application No. 16/612,609, filed as application No. PCT/CN2018/091612 on Jun. 15, 2018, now Pat. No. 11,581,926.

(30) Foreign Application Priority Data

May 11, 2017 (CN) .......................... 201710331353.3

(51) Int. Cl.
*H04B 7/0456* (2017.01)
*H04B 7/06* (2006.01)

(52) U.S. Cl.
CPC ........... *H04B 7/0478* (2013.01); *H04B 7/046* (2013.01); *H04B 7/0482* (2013.01); *H04B 7/0486* (2013.01); *H04B 7/0639* (2013.01)

(58) Field of Classification Search
None
See application file for complete search history.

(56) References Cited

U.S. PATENT DOCUMENTS

2013/0058204 A1 3/2013 Lin
2013/0107915 A1 5/2013 Benjebbour
(Continued)

FOREIGN PATENT DOCUMENTS

| CN | 102368698 A | 3/2012 |
|---|---|---|
| CN | 102939775 A | 2/2013 |

(Continued)

OTHER PUBLICATIONS

Chinese Office Action for corresponding application 201710331353. 3: Report dated Jun. 21, 2021.
(Continued)

*Primary Examiner* — Minh Trang T Nguyen
(74) *Attorney, Agent, or Firm* — CANTOR COLBURN LLP

(57) ABSTRACT

Provided are a codebook configuration method and a device for the same and a storage medium. A communication device determines configuration information of a codebook, where the configuration information of the codebook includes at least one of value range selection information of a base vector in a construction model of the codebook or value range selection information of a codeword in the codebook. The communication device sends the configuration information of the codebook to a communication peer end.

15 Claims, 8 Drawing Sheets

A communication device determines configuration information of a codebook, where the configuration information of the codebook includes value range selection information of a codeword in the codebook ~210

The communication device sends the configuration information of the codebook to a communication peer end ~220

(56) References Cited

U.S. PATENT DOCUMENTS

| | | | |
|---|---|---|---|
| 2013/0173665 A1* | 7/2013 | Colena | G06F 7/00 |
| | | | 707/802 |
| 2016/0065281 A1 | 3/2016 | Onggosanusi | |
| 2016/0294454 A1 | 10/2016 | Onggosanusi | |
| 2016/0353290 A1 | 12/2016 | Nammi | |
| 2017/0126376 A1* | 5/2017 | Wang | H04L 5/006 |
| 2018/0102817 A1 | 4/2018 | Park | |
| 2018/0191410 A1* | 7/2018 | Liu | H04B 7/0658 |

FOREIGN PATENT DOCUMENTS

| | | |
|---|---|---|
| CN | 106160926 A | 11/2016 |
| CN | 106330272 A | 1/2017 |
| CN | 106487434 A | 3/2017 |
| CN | 106559111 A | 4/2017 |
| CN | 108111206 A | 6/2018 |
| WO | 2016159623 A | 10/2016 |

OTHER PUBLICATIONS

Chinese Search Report for corresponding application 201710331353.3: Report dated Jun. 21, 2021.
International Search Report Aug. 29, 2018 re: Application No. PCT/CN2018/091612, pp. 1-2, citing: CN 108111206 A, WO 2016159623 A1, CN 106559111 A and CN 106160926 A.
Chinese Office Action for application 202211236291.5; Report dated May 16, 2024.
Chinese Search Report for application 202211236291.5; Report dated May 14, 2024.

* cited by examiner

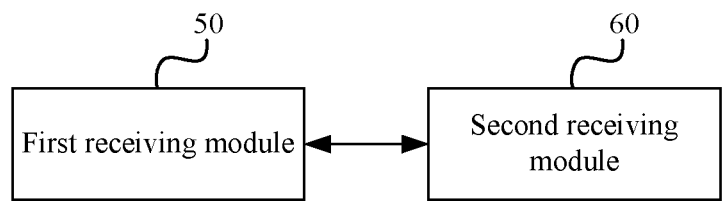
FIG. 18
FIG. 19
FIG. 20

CODEBOOK CONFIGURATION METHOD, PORT CONFIGURATION METHOD, AND DEVICE

CROSS-REFERENCE TO RELATED APPLICATIONS

This is a Continuation Application of U.S. patent application Ser. No. 16/612,609 which is a U.S National Stage Application of International Patent Application No. PCT/CN2018/091612, filed on Jun. 15, 2018, which claims priority to Chinese Patent Application No. 201710331353.3 filed on May 11, 2017, disclosures of which are incorporated herein by reference in their entireties.

TECHNICAL FIELD

The present disclosure relates to communication technologies, for example, a codebook configuration method and a device for the same and a storage medium.

BACKGROUND

In a wireless communication system, multiple antennas are used by a transmitting end and a receiving end in a manner of spatial multiplexing to acquire a higher rate. The receiving end feeds back channel information to the transmitting end and the transmitting end uses a transmitting precoding technology according to the acquired channel information, greatly improving transmission performance. In the 3rd Generation Partnership Project (3GPP) Long Term Evolution (LTE) plan, a simple single codebook feedback method is mainly used for feedback of channel information. However, the performance of multiple input multiple output (MIMO) transmitting precoding technology depends on the feedback accuracy of the codebook.

The basic principle of codebook-based channel information quantization feedback is briefly described as follows: assuming that the capacity of limited feedback channels is B bps/Hz, then the number of available codewords is $N=2^B$. The eigen vector space of a channel matrix is quantized to form a codebook space $\Re = \{F_1, F_2 \ldots F_N\}$. The transmitting end and the receiving end jointly store or generate in real time the codebook $\Re$ (which is the same at the transmitting end and the receiving end). For a channel matrix H obtained by each channel estimation, the receiving end selects a codeword $\hat{F}$ which best matches the channel matrix H from the codebook space $\Re$ according to a certain rule, and feeds back a serial number i of the codeword $\hat{F}$ (that is, the serial number of the codeword) to the transmitting end. Herein, the serial number of the codeword is referred to as a precoding matrix indicator (PMI) in the codebook. The transmitting end finds a corresponding precoding codeword $\hat{F}$ according to the serial number i and obtains corresponding channel information, where $\hat{F}$ represents eigen vector information of the channel. The channel matrix H is generally obtained through channel measurement of a channel measurement reference signal.

The codebook space $\Re$ may be further divided into codebooks corresponding to a plurality of Ranks, each Rank corresponds to a plurality of codewords to quantize a precoding matrix formed by channel eigen vectors under the rank. The Rank and the number of non-zero eigen vectors of the channel are equal. Therefore, generally speaking, when the Rank is N, there are N columns of codewords. Therefore, the codebook space $\Re$ may be divided into a plurality of sub-codebooks according to different Ranks, as shown in Table 1.

TABLE 1

Schematic division of the codebook into sub-codebooks by Rank $\Re$

| The number of layers υ (Rank) | | | |
|---|---|---|---|
| 1 | 2 | ... | N |
| $\Re_1$ | $\Re_2$ | ... | $\Re_N$ |
| Codeword vector set with 1 column | Codeword matrix set with 2 columns | ... | Codeword matrix set with N columns |

When Rank>1, the codewords that need to be stored are in form of the matrix, and such feedback method of codebook quantization is used for the codebook in the LTE protocol. Several forms of codebooks in current LTE systems are described as follows.

Form 1: Single PMI codebook form, for example, a 4-antenna codebook of Rel-8 version, in the form that each codeword under a rank indicator (RI) corresponds to a PMI index. An example is as follows.

| | Index 0 | Index 1 | | Index 15 |
|---|---|---|---|---|
| Layer/RI = 1 | Codeword 0 | Codeword 1 | ... | Codeword 15 |
| Layer/RI = 2 | Codeword 0 | Codeword 1 | ... | Codeword 15 |
| Layer/RI = 3 | Codeword 0 | Codeword 1 | ... | Codeword 15 |
| Layer/RI = 4 | Codeword 0 | Codeword 1 | ... | Codeword 15 |

Form 2: Dual PMI codebook form, for example, an 8-antenna codebook of Rel-10 version, in the form that each codeword under the RI corresponds to two PMI indexes.

| Layer/RI = 1 or 2 | | | |
|---|---|---|---|
| | PMI1-Index 0 | PMI1-Index 1 | ... | Index 15 |
| PMI2-Index 0 | Codeword (0,0) | Codeword (1,0) | ... | Codeword (15,0) |
| PMI2-Index 1 | Codeword (0,1) | Codeword (1,1) | ... | Codeword (15,1) |
| ... | ... | ... | ... | ... |
| PMI2-Index 15 | Codeword (0,15) | Codeword (1,15) | ... | Codeword (15,15) |

| Layer/RI = 3 | | | |
|---|---|---|---|
| | PMI1-Index 0 | PMI1-Index 1 | ... | Index 15 |
| PMI2-Index 0 | Codeword (0,0) | Codeword (1,0) | ... | Codeword (15,0) |
| PMI2-Index 1 | Codeword (0,1) | Codeword (1,1) | ... | Codeword (15,1) |
| ... | ... | ... | ... | ... |
| PMI2-Index 7 | Codeword (0,15) | Codeword (1,15) | ... | Codeword (7,15) |

-continued

| | Layer/RI = 4 | | | |
|---|---|---|---|---|
| | PMI1-Index 0 | PMI1-Index 1 | ... | Index 7 |
| PMI2-Index 0 | Codeword (0,0) | Codeword (1,0) | ... | Codeword (7,0) |
| PMI2-Index 1 | Codeword (0,1) | Codeword (1,1) | ... | Codeword (7,1) |
| ... | ... | ... | ... | ... |
| PMI2-Index 7 | Codeword (0,7) | Codeword (1,7) | ... | Codeword (7,7) |

With the development of Multiple Input Multiple Output (MIMO) technology, more complex antenna configurations need to be supported in 5G New Radio (NR), including a plurality of antenna panels are supported and that the number of antennas is significantly increased and that the antenna topology is more diversified. In the channel aspect, with a significant increase of application scenarios, the operating frequency is extended to more than 10 GHz, and the channel characteristics are richer than those in 4G.

A significant increase in the number of antennas in 5G will lead to a higher dimension of the channel matrix and a larger information dimension of the feedback channel. If the quantization accuracy is to be maintained approximate to that of the small number of antennas, the feedback overhead will be multiplied significantly. Moreover, the more characteristics of the wireless channel, the more complex the antenna topology, and the more models and number of codewords that need to be considered, resulting in a relatively low efficiency for applying the unified codebook design to various quantization feedback, including high complexity of codeword search, long search time and a significant increase in signaling overhead.

SUMMARY

A codebook configuration method is provided in an embodiment of the present disclosure and includes steps described below.

A communication device determines configuration information of a codebook. The configuration information of the codebook includes at least one of value range selection information of a base vector in a construction model of the codebook or value range selection information of a codeword in the codebook.

The communication device sends the configuration information of the codebook to a communication peer end.

A codebook configuration device is further provided in an embodiment of the present disclosure and includes a determining module and a sending module The determining module is configured to determine configuration information of a codebook, where the configuration information of the codebook includes at least one of value range selection information of a base vector in a construction model of the codebook or value range selection information of a codeword in the codebook.

The sending module is configured to send the configuration information of the codebook to a communication peer end.

In an embodiment, the value range selection information of the base vector includes value range information of part or all of base vector parameters related to the base vector, where the value range information includes at least one of the following: a starting position, an ending position, the number of values or a selection rule.

The value range selection information of the codeword is represented by value range information of a codeword index, and the value range information of the codeword index includes at least one of the following information about the codeword index: a starting position, an ending position, the number of values or a selection rule.

A communication device is further provided in an embodiment of the present disclosure and includes a memory, a processor, and a computer program stored in the memory and executable on the processor, where when the processor executes the computer program, the processor implements the following steps.

Configuration information of a codebook is determined, where the configuration information of the codebook includes at least one of value range selection information of a base vector in a construction model of the codebook or value range selection information of a codeword in the codebook.

The configuration information of the codebook is sent to a communication peer end.

In an embodiment, the processor determines the configuration information of the codebook as follows: the communication device configures the value range selection information of the base vector or the value range selection information of the codeword in at least one of the following manners.

Value range selection information of the base vector or value range selection information of the codeword is configured with respect to a plurality of rank groups or layer groups, respectively.

Value range selection information of the base vector or value range selection information of the codeword is configured with respect to r a plurality of feedback manners, respectively.

Value range selection information of the base vector or value range selection information of the codeword is configured with respect to a plurality of antenna groups, respectively.

Value range selection information of the base vector or value range selection information of the codeword is configured with respect to a plurality of measurement reference signal sets, respectively.

A value selection range includes a plurality of sub-ranges, and value range selection information of the base vector or value range selection information of the codeword is configured for the plurality of sub-ranges, respectively.

A computer readable storage medium is further provided in an embodiment of the present disclosure, and is configured to store a computer program, where when a processor executes the computer program, the following steps are implemented.

Configuration information of a codebook is determined, where the configuration information of the codebook includes at least one of value range selection information of a base vector in a construction model of the codebook or value range selection information of a codeword in the codebook.

The configuration information of the codebook is sent to a communication peer end.

A port configuration method is further provided in an embodiment of the present disclosure and includes steps described below.

A communication device determines port configuration information, where the port configuration information includes selection information of port groups. The port group includes at least one port, and when the number of selected port groups is greater than 1, the port groups are selected in an equally spaced manner.

The communication device sends the port configuration information to a communication peer end.

A port configuration device is further provided in an embodiment of the present disclosure and includes a determining module and a sending module.

The determining module is configured to determine port configuration information, where the port configuration information includes selection information of port groups, the port group includes at least one port, and when the number of selected port groups is greater than 1, the port groups are selected in an equally spaced manner.

The sending module is configured to send the port configuration information to a communication peer end.

In an embodiment, the selection information of the port group is represented by value range information of a port group index, and the value range information of the port group index includes at least one of the following information of the port group index: a starting position, an ending position, the number of values or a selection rule.

A communication device is further provided in an embodiment of the present disclosure and includes a memory, a processor, and a computer program stored in the memory and executable on the processor, where when the processor executes the computer program, the processor implements the following steps.

Port configuration information is determined, where the port configuration information includes selection information of port groups, the port group includes at least one port, and when the number of selected port groups is greater than 1, the port groups are selected in an equally spaced manner.

The port configuration information is sent to a communication peer end.

In an embodiment, the port configuration information is determined as follows: the selection information of the port group is configured in at least one of the following manners.

Selection information of the port group is configured with respect to a plurality of rank groups or layer groups, respectively.

Selection information of the port group is configured with respect to a plurality of feedback manners, respectively.

Selection information of the port group is configured with respect to a plurality of antenna groups, respectively.

Selection information of the port group is configured with respect to a plurality of measurement reference signal sets, respectively.

A computer readable storage medium is further provided in an embodiment of the present disclosure, and is configured to store a computer program, where when a processor executes the computer program, the following steps are implemented.

Port configuration information is determined, where the port configuration information includes selection information of port groups, the port group includes at least one port, and when the number of selected port groups is greater than 1, the port groups are selected in an equally spaced manner.

The port configuration information is sent to a communication peer end.

According to the solutions of the embodiments described above, the overhead can be effectively saved, the complexity is reduced, and the quantization efficiency is improved.

A codebook configuration method is provided in an embodiment of the present disclosure and includes steps described below.

A base station sends, in layer-3 signaling, at least one of a range parameter of a first class or a density parameter of a first class to a terminal.

The base station sends, in layer-2 signaling or in layer-1 signaling, at least one of a range parameter of a second class or a density parameter of a second class to the terminal.

The range parameter is used for indicating at least one of value range selection information of a base vector in a construction module of a codebook or value range selection information of a codeword; and the density parameter is used for indicating a density of the base vector.

A codebook configuration device is provided in an embodiment of the present disclosure and includes a first sending module and a second sending module.

The first sending module is configured to send, in layer-3 signaling, at least one of a range parameter of a first class or a density parameter of a first class to a terminal.

The second sending module is configured to send, in layer-2 signaling or in layer-1 signaling, at least one of a range parameter of a second class or a density parameter of a second class to the terminal.

The range parameter is used for indicating at least one of value range selection information of a base vector in a construction module of a codebook or value range selection information of a codeword; and the density parameter is used for indicating a density of the base vector.

A codebook configuration method is provided in an embodiment of the present disclosure and includes steps described below.

A terminal receives through layer-3 signaling at least one of a range parameter of a first class or a density parameter of a first class sent by a base station.

The terminal receives through layer-2 signaling or layer-1 signaling at least one of a range parameter of a second class or a density parameter of a second class sent by the base station.

The range parameter is used for indicating at least one of value range selection information of a base vector in a construction module of a codebook or value range selection information of a codeword; and the density parameter is used for indicating a density of the base vector.

A codebook configuration device is provided in an embodiment of the present disclosure and includes a first receiving module and a second receiving module.

The first receiving module is configured to receive, in layer-3 signaling, at least one of a range parameter of a first class or a density parameter of a first class sent by a base station.

The second receiving module is configured to receive, in layer-2 signaling or in layer-1 signaling, at least one of a range parameter of a second class or a density parameter of a second class sent by the base station.

The range parameter is used for indicating at least one of value range selection information of a base vector in a construction module of a codebook or value range selection information of a codeword; and the density parameter is used for indicating a density of the base vector.

The codebook configuration method described above can implement fast configuration of the codebook.

A measuring and reporting method is provided in an embodiment of the present disclosure and includes a step described below.

A terminal measures and reports channel state information (CSI) according to codebook subset restriction (CSR), where the CSI includes a first precoding matrix indicator (PMI) and a second PMI.

Other aspects can be understood after the drawings and the detailed description are read and understood.

BRIEF DESCRIPTION OF DRAWINGS

FIG. 18 is a block diagram of a codebook configuration device on a terminal side according to Embodiment nine of the present disclosure;

FIG. 19 is a schematic diagram of an example of Embodiment nine of the present disclosure; and FIG. 20 is a schematic diagram of a first-class PMI and a second-class PMI according to Embodiment ten of the present disclosure.

DETAILED DESCRIPTION

Embodiments herein will be described below in detail with reference to the drawings. It is to be noted that if not in collision, the embodiments and features therein in the present application may be combined with each other.

Embodiment One

All codewords in a codebook generally cover all beam ranges. In the process of communication between a base station and a terminal, the base station can determine a direction between the terminal and the base station according to a geographical position of the terminal, and can also determine a distribution probability of a corresponding Discrete Fourier Transform (DFT) beam vector according to the direction combined with an antenna configuration, thereby determining a reasonable beam range according to the probability. That is, in a period of time, codewords actually used by the terminal are merely part of the codewords in the codebook. According to the embodiment of the present disclosure, value range selection information of a base vector used for constructing the codeword is added to configuration information of the codebook, so that the terminal performs feedback based on a selected subset of the codebook, thereby maximizing the efficiency of the codebook.

Figure 1:
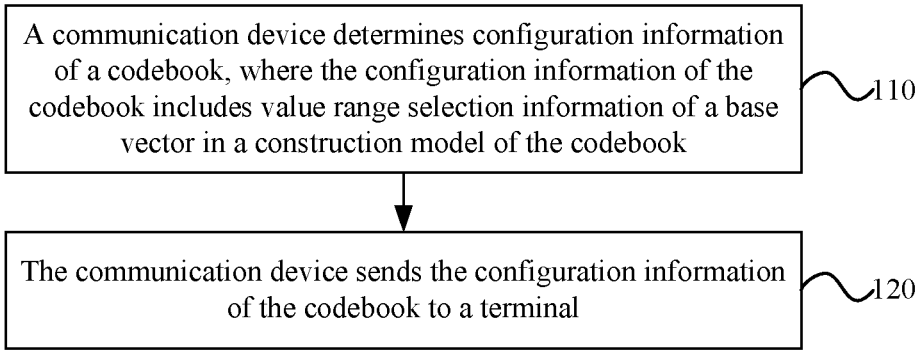
FIG. 1 is a flowchart of a codebook configuration method according to Embodiment one of the present disclosure.

As shown in FIG. 1, a codebook configuration method provided by the embodiment includes steps 110 and 120. In step 110, a communication device determines configuration information of a codebook. The configuration information of the codebook includes value range selection information of a base vector in a construction model of the codebook. In step 120, the base station sends the configuration information of the codebook to a terminal. The configuration information of the codebook includes at least one of configuration information of a codebook generation parameter or configuration information of a codebook subset restriction parameter. The value range selection information of the base vector is used by the terminal for constructing a subset including the codebook and performing quantization feedback of channel information based on the subset. In another embodiment, the terminal may also configure the codebook and send the configuration information to the base station according to the method of the embodiment.

The codebook in step 110 may be a channel information quantization codebook or a precoding indication codebook, but is not limited thereto herein. In an embodiment, a codeword construction model adopted by the codebook $C_b(r)$ includes n base vectors and q phase rotation values, where n and q are integers greater than or equal to 1, and r represents rank or layer.

In the embodiment, when the base station determines the configuration information of the codebook, the value range selection information of the base vector may be configured in at least one of the following manners.

The value range selection information of the base vector or the value range selection information of the codeword is configured for various rank groups or layer groups, respectively.

The value range selection information of the base vector or value range selection information of the codeword is configured for various feedback manners (such as a physical uplink control channel (PUCCH) and a physical uplink data channel (PUSCH)), respectively.

The value range selection information of the base vector or value range selection information of the codeword is configured for various antenna groups, respectively.

The value range selection information of the base vector or value range selection information of the codeword is configured for various measurement reference signal sets, respectively.

When a value selection range includes a plurality of sub-ranges, the value range selection information of the base vector or value range selection information of the codeword is configured for various sub-ranges, respectively.

In the embodiment, when a plurality of base vectors are provided, the base station configures the value range selection information for the plurality of base vectors, respectively, for example, the value range selection information for the first base vector, the value range selection information for the second base vector and the value range selection information for the third base vector.

In the embodiment, the value range selection information of the base vector includes value range information of part or all of base vector parameters related to the base vector. The value range information includes at least one of the following: a starting position, an ending position, the number of values (for example, which may be a power of 2) or a selection rule. The starting position and the ending position may each be represented by a corresponding index, starting angle or phase. The selection rule may be represented by an index spacing, a phase spacing or an angle spacing. For example, if a starting index is 0 and the index spacing is 2, indexes 0, 2, 4, . . . , etc. are selected from an index set. There are a plurality of base vector parameters related to the base vector, and the value range information is configured for each of the plurality of base vector parameters, respectively.

In the embodiment, a value range selected for the base vector may include a plurality of sub-ranges, at the moment the value range selection information of the base vector may include value range selection information configured for each of the plurality of sub-ranges.

In the embodiment, value selection ranges of the base vector are configured for different codeword construction models, respectively.

In another embodiment, the value range selection information of the base vector is configured in a manner of a bitmap. Each bit in the bitmap corresponds to a base vector group including at least one base vector. A first state (for example, the first state is "1") of a bit in the bitmap represents that a base vector group corresponding to the bit is selected, a second state (for example, the second state is "0") represents that the base vector group corresponding to the bit is not selected, and any two adjacent bits in the first state are spaced apart by the same number of bits in the second state. In an embodiment, a value range determined based on the value range selection information of the base vector includes at least one sub-range, and a difference between any adjacent values is equal in all sub-ranges. In addition, when a plurality of base vectors are included in a base vector group, the base vectors may be configured at equal spacings. A continuous configuration is a special case of a configuration at equal spacings.

In the embodiment, the configuration information of the codebook may further include selection range information of the phase rotation value. According to the selection range information of the phase rotation values, available phase rotation values may be selected from a set of phase rotation values. The set of phase rotation values may be a binary phase shift keying (BPSK) set, a quadrature phase shift keying (QPSK) set, an 8 phase shift keying (8PSK) set, or the like. When various feedback manners exist, the selection range information of the phase rotation values may be configured for each of the feedback manners, respectively. The selection range information of the phase rotation values may be configured for different codeword models, respectively. In addition, the selection range information of the phase rotation values may include the number of values of the phase rotation values, where the number of values may be a power of 2.

In the embodiment, after the terminal receives the configuration information of the codebook, a codebook is constructed according to the configuration information of the codebook, and the channel information is quantized and fed back by using a subset (which may be a codebook itself) constituted by the available codewords in the codebook.

Figure 2:
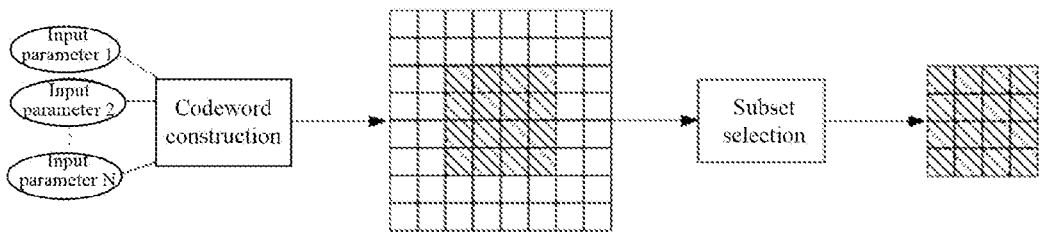
FIG. 2 is a schematic diagram of a codebook configuration method according to Embodiment one of the present disclosure.

FIG. 2 is a schematic diagram of codebook configuration. A base station constructs the codeword according to input parameters (in the figure, the input parameters are represented by "input parameter 1", "input parameter 2", . . . , input parameter "N") to obtain the codebook, and selects a subset of the codebook according to an estimated beam range. The base station sends configuration information related to selection of the subset to the terminal, so that the terminal constructs the codebook subset and uses the codebook subset.

Figure 3:
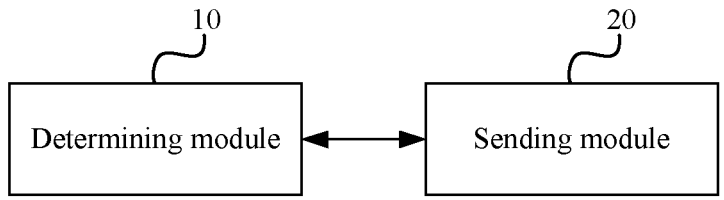
FIG. 3 is a block diagram of a codebook configuration device according to Embodiment one of the present disclosure.

As shown in FIG. 3, a codebook configuration device is further provided in an embodiment of the present disclosure and includes a determining module 10 and a sending module 20.

The determining module 10 is configured to determine configuration information of a codebook. The configuration information of the codebook includes value range selection information of a base vector in a construction model of the codebook.

The sending module 20 is configured to send the configuration information of the codebook to a communication peer end.

In the embodiment, the configuration information of the codebook includes at least one of configuration information of a codebook generation parameter or configuration information of a codebook subset restriction parameter.

In the embodiment, the determining module is configured to determine the configuration information of the codebook through the following operation: configuring the value range selection information of the base vector or the value range selection information of the codeword in at least one of following manners.

The value range selection information of the base vector or value range selection information of the codeword is configured for various rank groups or layer groups, respectively.

The value range selection information of the base vector or value range selection information of the codeword is configured for various feedback manners, respectively.

The value range selection information of the base vector or value range selection information of the codeword is configured for various antenna groups, respectively.

The value range selection information of the base vector or value range selection information of the codeword is configured for various measurement reference signal sets, respectively.

If a value selection range includes a plurality of sub-ranges, the value range selection information of the base vector or value range selection information of the codeword is configured for each of the plurality of sub-ranges, respectively.

In the embodiment, the value range selection information of the base vector includes value range information of part or all of base vector parameters related to the base vector, where the value range information includes at least one of: a starting position, an ending position, the number of values and a selection rule.

In another embodiment, the value range selection information of the base vector is configured in a manner of a bitmap. Each bit in the bitmap corresponds to a base vector group including at least one base vector. A first state of each bit in the bitmap represents that a base vector group corresponding to the bit is selected, a second state represents that the base vector group corresponding to the bit is not selected, and any two adjacent bits in the first state are spaced apart by the same number of bits in the second state. In an embodiment, a value range determined by the value range selection information of the base vector includes at least one sub-range, and a difference between any adjacent values is equal in all sub-ranges.

A communication device is further provided in an embodiment of the present disclosure and includes a memory, a processor, and a computer program stored in the memory and executable on the processor. When the processor executes the computer program, the processor implements the following steps.

Configuration information of a codebook is determined, where the configuration information of the codebook includes value range selection information of a base vector in a construction model of the codebook.

The configuration information of the codebook is sent to a communication peer end.

A computer readable storage medium is further provided in an embodiment of the present disclosure, and is configured to store a computer program, where when a processor executes the computer program, the following steps are implemented.

Configuration information of a codebook is determined, where the configuration information of the codebook includes value range selection information of a base vector in a construction model of the codebook.

The configuration information of the codebook is sent to a communication peer end.

In an embodiment, the configuration information of the codebook includes at least one of configuration information of a codebook generation parameter or configuration information of a codebook subset restriction parameter.

In an embodiment, the processor determines the configuration information of the codebook as follows: the communication device configures the value range selection information of the base vector or the value range selection information of the codeword in at least one of the following manners.

The value range selection information of the base vector or value range selection information of the codeword is configured for various rank groups or layer groups, respectively.

The value range selection information of the base vector or value range selection information of the codeword is configured for various feedback manners, respectively.

The value range selection information of the base vector or value range selection information of the codeword is configured for various antenna groups, respectively.

The value range selection information of the base vector or value range selection information of the codeword is configured for various measurement reference signal sets, respectively.

The value range selection information of the base vector includes value range selection information configured for a plurality of sub-ranges, respectively.

In an embodiment, the value range selection information of the base vector includes value range information of part or all of base vector parameters related to the base vector, where the value range information includes at least one of: a starting position, an ending position, the number of values and a selection rule.

According to the solutions of the embodiments described above, the number of beams can be effectively reduced, the overhead is effectively saved, the complexity is reduced, and the quantization efficiency is improved.

Embodiment Two

The value range selection information of a base vector is included in the configuration information of Embodiment one, and value range selection information of a codeword in a codebook is included in the embodiment. The content different from that of Embodiment 1 will be mainly described below.

Figure 4:
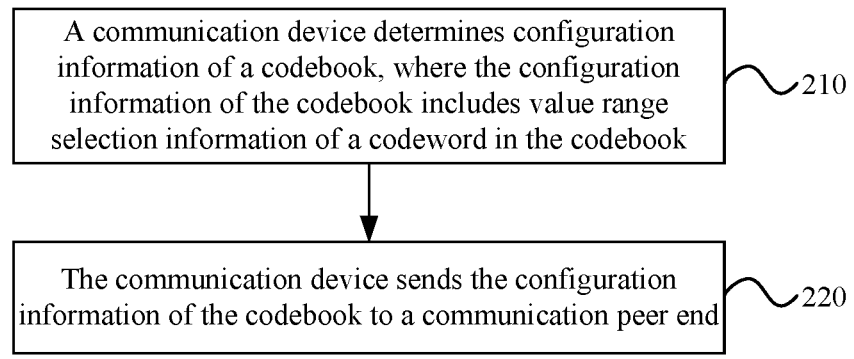
FIG. 4 is a flowchart of a codebook configuration method according to Embodiment two of the present disclosure.

As shown in FIG. 4, a codebook configuration method provided by the embodiment includes steps 210 and 220. In step 210, a communication device determines configuration information of the codebook, where the configuration information of the codebook includes value range selection information of the codeword in the codebook. In step 220, the communication device sends the configuration information of the codebook to a communication peer end. The configuration information of the codebook includes at least one of configuration information of a codebook generation parameter or configuration information of a codebook subset restriction parameter. In another embodiment, the configuration information of the codebook may include both value range selection information of the base vector and value range selection information of the codeword.

A codebook configuration device is further provided in the embodiment of the present disclosure and includes a determining module and a sending module.

The determining module is configured to determine configuration information of a codebook, where the configuration information of the codebook includes value range selection information of a codeword in the codebook.

The sending module is configured to send the configuration information of the codebook to a communication peer end.

A communication device is further provided in the embodiment of the present disclosure and includes a memory, a processor, and a computer program stored in the memory and executable on the processor, where when the processor executes the computer program, the processor implements the following steps.

Configuration information of a codebook is determined, where the configuration information of the codebook includes value range selection information of a codeword in the codebook.

The configuration information of the codebook is sent to a communication peer end.

A computer readable storage medium is further provided in the embodiment of the present disclosure, and is configured to store a computer program, where when a processor executes the computer program, the following steps are implemented.

Configuration information of a codebook is determined, where the configuration information of the codebook includes value range selection information of a codeword in the codebook.

The configuration information of the codebook is sent to a communication peer end.

In the embodiment, the value range selection information of the codeword is represented by value range information of a codeword index. The value range information of the codeword index includes at least one of the following information of the codeword index: a starting position, an ending position, the number of values and a selection rule. The starting position and the ending position may each be represented by a corresponding word index. The selection rule may be selection at equal spacing.

In another embodiment, the value range selection information of the codeword is configured in a manner of a bitmap. Each bit in the bitmap corresponds to a codeword group or a codeword index value group. The codeword group includes at least one codeword, and the codeword index value group includes at least one index value. A first state (for example, "1") of each bit in the bitmap represents that a codeword group or a codeword index value group corresponding to the bit is selected, a second state (for example, "0") represents that the codeword group or the codeword index value group corresponding to the bit is not selected, and any two adjacent bits in the first state are spaced apart by the same number of bits in the second state. In addition, when a plurality of codewords are included in the codeword group, the codewords may be configured continuously or at equal spacing.

According to the solutions of the embodiment described above, the number of beams can be effectively reduced, the overhead is effectively saved, the complexity is reduced, and the quantization efficiency is improved.

Embodiment Three

The embodiment provides an implementation mode in the case of downlink Type I feedback of channel state information (CSI).

The codebook of Type I is a traditional codebook feedback method. The main point of thereof is that after a codeword matrix is divided into blocks, each block is consisted of one base vector or a product (such as Kronecker product) of a plurality of base vectors.

In step A01, a transmitting end determines a codeword construction model.

A base station and a terminal may agree on the codeword construction model, and the codeword construction model may also be determined by the base station and then provided to the terminal.

For Rank1, a common codeword model is as follows.

$$W^{(1)}_{m_1,m_2,n} = \frac{1}{\sqrt{Q}} \begin{bmatrix} v_{m_1} \otimes u_{m_2} \\ \phi_n v_{m_1} \otimes u_{m_2} \end{bmatrix}$$

The codeword model includes two base vectors:

$$v_{m_1} = \begin{bmatrix} 1 & e^{j\frac{2\pi m_1}{o_1 N_1}} & \dots & e^{j\frac{2\pi m_1(N_1-1)}{o_1 N_1}} \end{bmatrix}^t \text{ and } u_{m_2} = \begin{bmatrix} 1 & e^{j\frac{2\pi m_2}{o_2 N_2}} & \dots & e^{j\frac{2\pi m_2(N_2-1)}{o_2 N_2}} \end{bmatrix}^t.$$

$N_1$ and $N_2$ are dimension control parameters of the codebook; $O_1$ and $O_2$ are control parameters of the density of the codebook or control parameters of the spacing between the base vectors; $\phi_n$ is a phase selection parameter, Q is a constant related to a codeword dimension, and $m_1$, $m_2$ and n are three indexes of a codeword W.

Here, the two base vectors are generally used to describe direction information of a first dimension and direction information of a second dimension. Considering a typical case of a same antenna panel, in most cases, antennas in a horizontal dimension are uniformly distributed, and antennas in a vertical dimension are also uniformly distributed, and therefore the two base vectors are discrete fourier transform (DFT) vectors, and a joint direction vector may be represented by the kronecker product of the base vectors corresponding to the two directions.

It should be noted that if other topology bases are provided, not necessarily only two base vectors are provided, for example, in the case of a plurality of antenna panels, more base vectors are needed. What mentioned above is mainly a direction representation in the antenna panels, a direction may be regarded as an extension of a dimension between panels, and more base vectors are needed.

It should be noted that the first dimension and the second dimension are not necessarily only used for describing the horizontal dimension and the vertical dimension, but may also be used for describing other dimensions.

It should be noted that the basic vector is not necessarily only the DFT vector, but needs to be determined according to the distribution of antennas. In addition, the joint direction vector is not necessarily in form of a kronecker product of the basic vectors, and may also be in form of a product or in form of a linear combination.

It should be noted that the joint direction vector may also be regarded as a base vector, which depends on the understanding of a mathematical form of the model.

In step A02, the transmitting end determines the configuration information of the codebook, and notifies the configuration information of the codebook to the terminal through signaling.

In practical applications, the base station may determine configuration information of a codeword according to a channel characteristic corresponding to an application scenario. In the embodiment, a codebook generation parameter is configured, and in another embodiment, a codebook subset restriction parameter may also be configured.

For example, parameters of $N_1$ and $N_2$ need to be determined. $N_1$ and $N_2$ may be determined according to a corresponding dimension in conjunction with a configuration of the antennas. It is common that $N_1$ corresponds to the number of antennas in the vertical dimension and that $N_2$ corresponds to the number of antennas in the horizontal dimension. Of course, it may be the other way around. It is also not excluded that $N_1$ corresponds to a first-level direction vector in an antenna group and that $N_2$ corresponds to a second-level direction vector between the antenna groups. A division of antenna groups may be implemented in a variety of manners. Correspondingly, each dimension may include density control parameters $O_1$ and $O_2$. The base station may determine the density control parameters $O_1$ and $O_2$ according to a frequency domain selection characteristic of the channel, a time domain selection characteristic and magnitudes of $N_1$ and $N_2$, and quantization accuracies are different for beams of different densities.

The configuration information of the codebook of the embodiment further includes value range selection information of the base vector, and a value selection range of the base vector may be represented by a selection range of a base vector parameter. In an embodiment, value selection ranges of two base vectors are represented by a selection range of $m_1$ and a selection range of $m_2$, respectively, that is, which values are selected from all values of $m_1$ and which values are selected from all values of $m_2$. In other embodiments, other base vector parameters may also be used for representation.

Figure 5A:
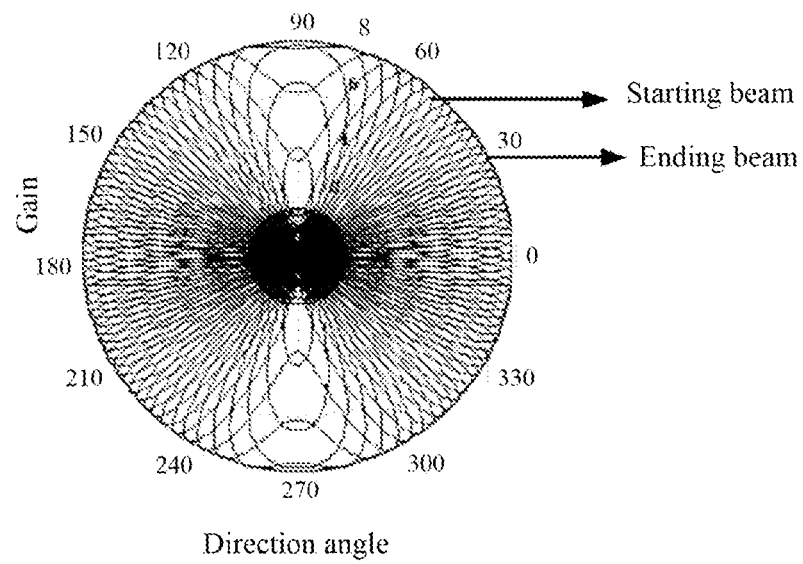
FIG. 5A and FIG. 5B are schematic diagrams of vector beam ranges of a base station in an example of Embodiment three of the present disclosure.
Figure 5B:
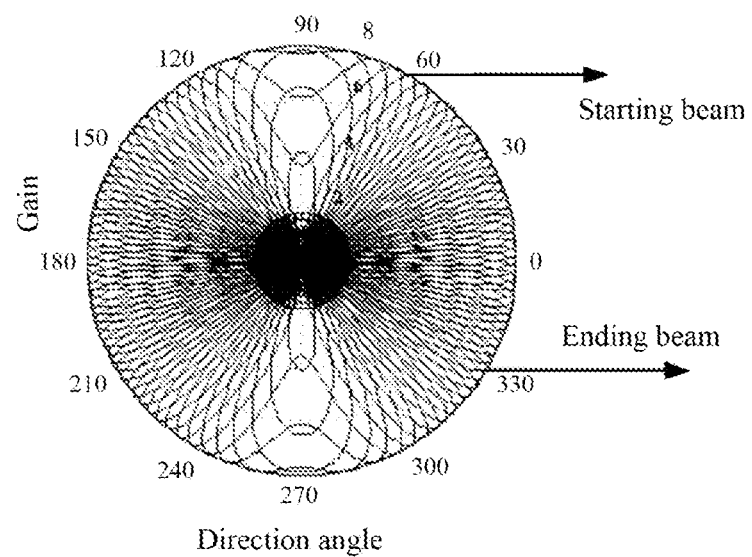

A subset of the codebook is obtained according to the value selection range of the base vectors. As shown in FIG. 5A and FIG. 5B, a selected beam range of the base vector is limited in a small section rather than an entire 360-degree space.

Through selection of base vector range, the number of beams can be effectively reduced. With selection of the base vector range, a direction between the terminal and the base station may be determined according to a geographical position of the terminal, and a distribution probability of a corresponding DFT beam vector is determined according to the direction combined with the configuration of the antennas, such as a parameter about the spacing, a working frequency point and a surrounding scatterer distribution, and a reasonable beam range is determined according to the probability, so that the efficiency of the codebook is maximized.

The above information may be used in combination or separately, such as a starting position plus an ending position, the starting position plus the number of values, the starting position plus the ending position plus a selection rule, the starting position plus the selection rule, etc. When a certain parameter, such as the starting position, is default, only another parameter may be specified. The starting position and the ending position may each be represented by a corresponding index, phase, and angle. In order to avoid unnecessary overhead waste and reduce complexity, the number of values of the base vector parameters may be limited to the power of 2, including 1, 2, 4, 8, 16, etc.

Figure 6:
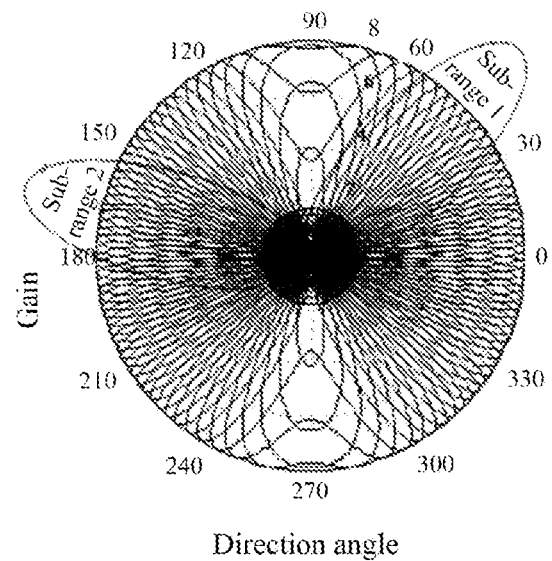
FIG. 6 is a schematic diagram of vector beam range of a base station in another example of Embodiment three of the present disclosure.

It should be noted that the value selection range of the base vector may be continuous. Alternatively, the value selection range of the base vector may not be completely continuous, that is, may include a plurality of sub-ranges. At this time, information of a selection range of the base vector parameter may be configured for the plurality of sub-ranges, respectively, for example, a sub-range 1 is configured to correspond to the starting position of the base vector parameter plus an ending position of the sub-range 1, and a sub-range 2 is configured to correspond to the starting position of the base vector parameter plus an ending position of the sub-range 2. Alternatively, the sub-range 1 is configured to correspond to the starting position of the base vector parameter plus the number of values, and the sub-range 2 is configured to correspond to the starting position of the base vector parameter plus the number of values. It should also be noted that the base vector configuration considered here may be applied to different Rank (r) values. FIG. 6 shows two corresponding beam ranges when two sub-ranges of the base vector exist.

In a case of different Ranks (r), in addition to that same sub-ranges may be configured, it may also be considered that different Ranks (r) are not completely provided with the same sub-ranges. First, ranks are divided into a plurality of groups according to a value r of RI. Each group has the same base vector range selection and shares the same configuration signaling.

For example, $RI_{max}=8$, which may be divided into two groups.

In an embodiment, RI/layer {1, 2} corresponds to the same base vector range selection, and RI/layer {3, 4, 5, 6, 7, 8} corresponds to the same base vector range selection.

In an embodiment, RI/layer {1, 2, 3, 4} corresponds to the same base vector range selection, and RI/layer {5, 6, 7, 8} corresponds to the same base vector range selection.

$RI_{max}=8$, which may be divided into three groups.

In an embodiment, RI/layer {1, 2} corresponds to the same base vector range selection, RI/layer {3, 4} corresponds to a group of codebooks, and RI/layer {5, 6, 7, 8} corresponds to the same base vector range selection.

In the embodiment, an angular range of a phase rotation may further be determined through configuration, for example, the angular range of the phase rotation may be configured as {1, j}, {1, −1}, {1, j, −1, −j}, {1, (1+j)/sqrt (2), j, (1−j)/sqrt (2)}, and {1, (1+j)/sqrt (2), j, (1−j)/sqrt (2), −1, (−1−j)/sqrt (2), −j, (−1+j)/sqrt (2)}, etc., where sqrt represents square root.

For a plurality of feedback manners, the base vectors and selection ranges of the phase rotation value may be configured for the plurality of feedback manners, respectively. Here, the feedback manners include: a PUCCH feedback manner/PUSCH feedback manner or some sub-manners included therein. For example, the PUCCH feedback manner may include a short-format PUCCH and a long-format PUCCH. The value ranges of the phase rotation parameter may also use a similar method, and may be configured respectively for a variety of feedback manners.

The above are some typical determining manners of configuration parameters of the codebook.

In step A03, the terminal constructs a codebook according to the configuration information of the codebook and the codeword model.

Here, codebooks of RI/Layer=1, 2 are taken as examples, and codebooks of other RI/layer values are similar to this one. Since a ratio of the occurrence of a low Rank is much higher than that of a high Rank, the number of codewords in the case of a high Rank/layer is generally less.

According to the standard, a codebook generation manner for RI/Layer=1 is as follows.

| $i'_2$ | 0 | 1 | 2 | 3 |
|---|---|---|---|---|
| Precoder | $W_{s_1i_{1,1},s_2i_{1,2},0}^{(1)}$ | $W_{s_1i_{1,1},s_2i_{1,2},1}^{(1)}$ | $W_{s_1i_{1,1},s_2i_{1,2},2}^{(1)}$ | $W_{s_1i_{1,1},s_2i_{1,2},3}^{(1)}$ |
| $i'_2$ | 4 | 5 | 6 | 7 |
| Precoder | $W_{s_1i_{1,1}+1,s_2i_{1,2},0}^{(1)}$ | $W_{s_1i_{1,1}+1,s_2i_{1,2},1}^{(1)}$ | $W_{s_1i_{1,1}+1,s_2i_{1,2},2}^{(1)}$ | $W_{s_1i_{1,1}+1,s_2i_{1,2},3}^{(1)}$ |
| $i'_2$ | 8 | 9 | 10 | 11 |
| Precoder | $W_{s_1i_{1,1}+2,s_2i_{1,2},0}^{(1)}$ | $W_{s_1i_{1,1}+2,s_2i_{1,2},1}^{(1)}$ | $W_{s_1i_{1,1}+2,s_2i_{1,2},2}^{(1)}$ | $W_{s_1i_{1,1}+2,s_2i_{1,2},3}^{(1)}$ |
| $i'_2$ | 12 | 13 | 14 | 15 |
| Precoder | $W_{s_1i_{1,1}+3,s_2i_{1,2},0}^{(1)}$ | $W_{s_1i_{1,1}+3,s_2i_{1,2},1}^{(1)}$ | $W_{s_1i_{1,1}+3,s_2i_{1,2},2}^{(1)}$ | $W_{s_1i_{1,1}+3,s_2i_{1,2},3}^{(1)}$ |
| $i'_2$ | 16-31 | | | |

The above table shows all codewords of the codebook, where each codeword is jointly determined by values of three indexes $m_1$, $m_2$ and n, and the values of $m_1$ and $m_2$ are related to indexes $i_{1,1}$, $i_{1,2}$ and $i_2$. $s_1$, $s_2$ represents a spacing of two patterns adjacent horizontally or vertically in the two dimensions, and $(s_1, s_2)=(1, 1)$ or $(2, 2)$. The value range of the base vector may be selected by restricting the values of $m_1$ and $m_2$. In another embodiment, the value range of the base vector may also be selected by configuring selection ranges of $i_{1,1}$, $i_{1,2}$, and $i_2$.

When other r values are taken, a generation principle of the codebook is similar to the description above, but the codeword model used is different, and a codebook parameter may also be different.

In step A04, a receiving end performs quantization feedback on channel information by using the codebook or a subset of the codebook.

A generated codebook may be used for quantization feedback of the channel information. For example, it may be that channel measurement is performed based on channel measurement reference signals, channel matrix information is acquired, and interference statistics information is obtained through interference measurement. Each precoding is traversed in the codebook and received according to a receiving technology of the terminal, capacity is calculated, and codewords capable of obtaining the maximum capacity are selected.

The codebook may be further reduced, but a feedback overhead does not change with the codebook any more. A codebook subset restriction (CSR) is usually used for implementation. Codebook subset restriction is to restrict a terminal from using part of codewords in the codebook for quantization feedback, which is equivalent to restricting the terminal to use only a pre-agreed or configured subset of the codebook. In one aspect, the technology may avoid interference in neighboring cells caused by precoding corresponding to some codewords reported by the terminal, and in another aspect, the complexity of codeword selection by a user equipment (UE) may be reduced.

Embodiment Four

The embodiment provides an implementation mode in case of downlink Type II CSI feedback.

The codebook of Type II is a traditional enhanced codebook feedback method, which is characterized in that after a codeword matrix is divided into blocks, each block may be constructed based on a plurality of base vectors in form of a product and in form of a linear combination.

$$\varphi_n = e^{j\pi n/2}$$

$$u_m = \begin{bmatrix} 1 & e^{j\frac{2\pi m}{O_2 N_2}} & \cdots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

$$W^v_{k_1,k_2,m_1,m_2,p,q_1,q_2,q_3} = \frac{1}{\sqrt{P(1+p^2)}} \begin{bmatrix} v_{k_1,k_2} + p\varphi_{q_3} v_{k_1+m_1,k_2+m_2} \\ \phi_{q_1}(v_{k_1,k_2} + p\varphi_{q_2} v_{k_1+m_1,k_2+m_2}) \end{bmatrix},$$

$v = 1,2$

For one layer: $W_{k_1,k_2,m_1,m_2,p,q_1,q_2,q_3}^{(1)} =$ $W_{k_1,k_2,m_1,m_2,p,q_1,q_2,q_3}^{1}$, and for two layers:

$$W^{(2)}_{k_1,k_2,m_1,m_2,p,q_{1,1},q_{2,1},q_{3,1},q_{1,2},q_{2,2},q_{3,2}} = \qquad (2)$$

$$\frac{1}{\sqrt{2}} \begin{bmatrix} W^1_{k_1,k_2,p,m_1,m_2,q_{1,1},q_{2,1},q_{3,1}} & W^2_{k_1,k_2,p,m_1,m_2,q_{1,2},q_{2,2},q_{3,2}} \end{bmatrix}$$

The above $k_1$, $k_2$, $m_1$, $m_2$, p, $q_1$, $q_2$, $q_3$ are parameters used in the codebook construction model, and a corresponding relationship between the parameters and precoding indexes may be determined according to $N_1$, $N_2$, $O_1$ and $O_2$ configured by a base station and a codebook table.

$v_{k_1,k_2} + p\varphi_{q_3} v_{k_1+m_1,k_2+m_2}$ is taken as an example, which is a linear combination. Listed here is the linear combination of two base vectors $v_{k_1,k_2}$ and $v_{k_1+m_1,k_2+m_2}$. A linear combination of more base vectors may also be supported through a more complex codebook. Essence of the linear combination is as follows: a plurality of multipath components in different directions exist in a channel, where the two base vectors respectively describe direction information of two main multipath components, and p actually describes power information (a relative value, a second component relative to a first component) corresponding to a multipath. $\varphi_{q_3}$ describes weighted phase information.

In the embodiment, after the $v_{k_1,k_2}$ is determined, a value of the $v_{k_1+m_1,k_2+m_2}$ is also related to $m_1$ and $m_2$. In addition to configuring selection ranges for $k_1$, $k_2$ selected value ranges may also be further configured for $m_1$, $m_2$ to determine the value ranges of selected base parameters $v_{k_1,k_2}$ and $v_{k_1+m_1,k_2+m_2}$. If two basic vector directions are independent selection, selected selection ranges may be configured for the two directions, respectively.

Embodiment Five

The embodiment provides an implementation mode in case of uplink precoding indication. For an uplink case, a base station is a receiving end.

A codebook configuration method in the embodiment includes steps described below.

In step one, the receiving end determines a codeword construction model.

A codebook configuration of the uplink may be similar to that of a downlink, and codewords of another codeword construction model may also be used, which depends on a configuration of the terminal antenna. The codeword construction model may be agreed on by the receiving end and a transmitting end, fed back by the transmitting end (a terminal) to the receiving end (a base station) or configured by the receiving end to the transmitting end.

Considering that the terminal may have a plurality panels, the base station may configure codebooks for different panels, respectively. Precoding vectors corresponding to the different panels may also be combined to construct high-dimensional codebooks for configuration.

In step two, the receiving end determines configuration information of the codebook.

The base station may determine configuration information of a codebook in the uplink in a manner similar to that in the downlink. The configuration information of the codebook may include a base vector dimension, a density parameter of the base vectors, a base vector range parameter, and the like. At least one of value range selection information of the base vector or value range information of a codeword may be configured in a manner similar to that in the downlink, and a direction range of the base vector is configured in the embodiment.

Figure 7:
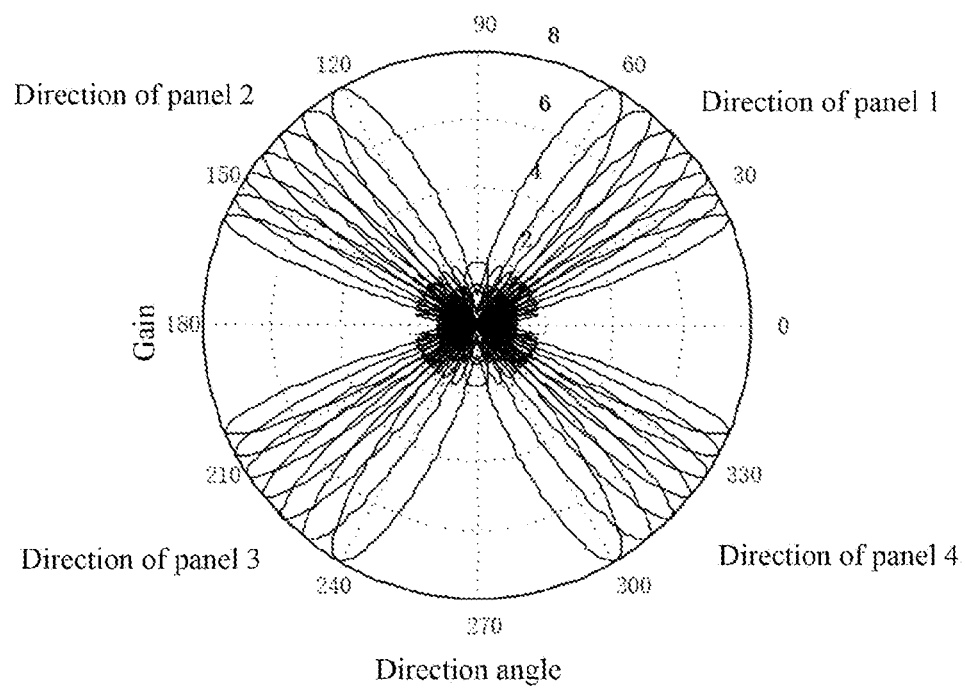
FIG. 7 is a schematic diagram of vector beam range of a base station in an example of Embodiment five of the present disclosure.

The value range selection information of the base vector or value range selection information of the codeword may be configured for the different panels, respectively. For example, four panels are provided and direction ranges of the base vector may be configured for the four panels, respectively, as shown in FIG. 7.

Multiple sets of reference signal resources (for example, sounding reference signal (SRS) resources) may exist, and correspond to different antenna groups (a panel may also be an antenna group), respectively. For example, two sets of SRS resources are provided, and direction ranges of the base vector may also be configured for various measurement reference resource sets, respectively.

The receiving end, i.e., the base station, also needs to send configuration parameters to the transmitting end through signaling, and the configuration parameters may also be determined by the transmitting end and then fed back to the receiving end.

In step three, the receiving end constructs a codebook according to the codebook configuration parameters and a codeword model.

In step four, the receiving end uses the codebook for pre-coding codeword selection in uplink transmission.

In the above embodiments, configuration information of a codebook generation parameter sent by the base station may be reconfigured and sent after a change in a terminal position so as to update a subset in use.

Embodiment Six

In the embodiment, a codeword in a codebook may be further restricted for a codebook generated according to an agreement or configuration, a corresponding feedback overhead may be changed or not changed, and the complexity can be significantly reduced even if the overhead is not changed.

The embodiment uses a manner of codebook subset restriction (CSR) to implement selection of a codeword to be used. Codebook subset restriction is to restrict a terminal from using part of codewords in the codebook for quantization feedback, and the effect is equivalent to restricting the terminal to use only a pre-agreed or configured subset of the codebook for quantization feedback. Of course, the CSR may also not perform any restriction on the codeword, at the moment, a subset of the codebook is the codebook itself. On the one hand, the manner can avoid interference in neighboring cells caused by precoding corresponding to some codewords reported by the terminal according to needs, and on the other hand, the complexity of codeword selection by the terminal (UE) can be reduced.

Similar to Embodiment one and Embodiment two, the embodiment may implement codebook subset restriction by configuring codebook subset restriction parameters in the codebook subset restriction (CSR) to indicate at least one of value range selection information of the base vector or value range selection information of the codeword.

Value range selection of the base vector may be implemented in two manners.

A first manner is as follows: when the codeword is constructed, a small codebook (a subset of the codebook) is constructed through a configuration of a codebook generation parameter, for example, $O_1$ and $O_2$ are small in value, and the value range selection information of the base vector is configured, when the subset restriction is performed, an overhead of the CSR signaling is small; the manner is adopted in Embodiment three.

Figure 8:
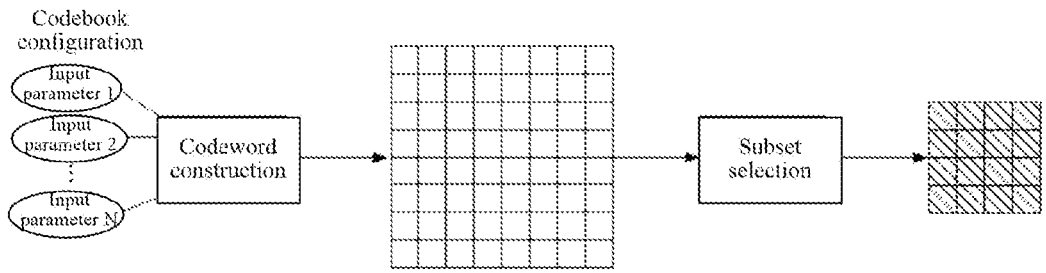
FIG. 8 is a schematic diagram of a codebook configuration method according to Embodiment six of the present disclosure.

A second manner is as follows: codeword selection is not performed when the codeword is constructed, a relatively large codebook is constructed, and subset selection is implemented through the CSR signaling, as shown in FIG. 8. The overhead of the CSR signaling is large in this manner, but codewords in the subset can be flexibly changed along with the time during use; the manner is adopted in the embodiment.

Similar codeword restrictions or selection of codebook subsets may be implemented in the two manners, and in another embodiment, the subset selection may also be jointly implemented in both manners.

In the embodiment, a codebook subset is selected by indicating a selected codeword group or base vector group.

Figure 9:
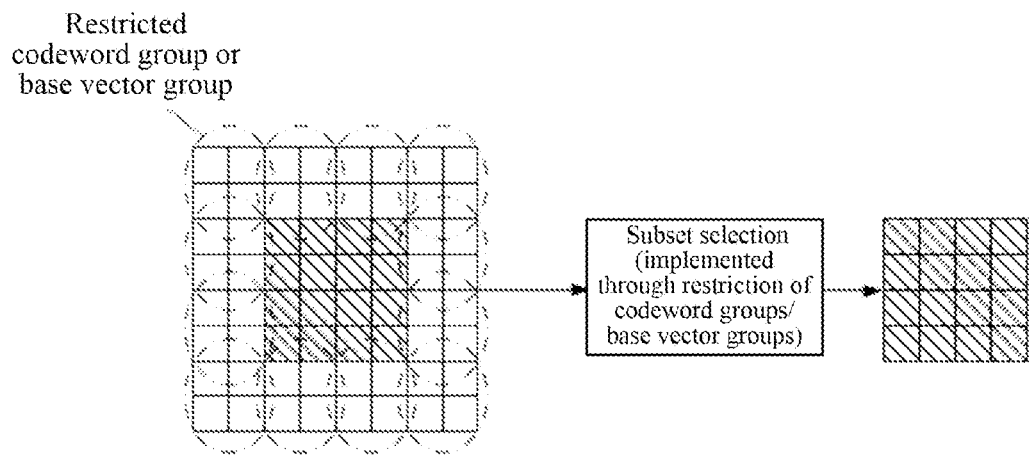
FIG. 9 is a schematic diagram of codebook subset selection according to Embodiment six of the present disclosure.

As shown in FIG. 9, a codeword group may include at least one codeword. When a plurality of codewords are included, a division rule of the codeword group need to be agreed on or configured. The number of codewords included in each codeword group may be a power of 2, and at the moment, the complexity is low. The number of selected codeword groups may also be a power of 2, for example 1, 2, 4, etc.

The base vector group may include at least one base vector. When a plurality of base vectors are included, a division rule of the base vector group need to be agreed on or configured. The number of base vectors included in each base vector group may be a power of 2, and at the moment, the complexity is low. The number of selected base vector groups may also be a power of 2, for example 1, 2, 4, etc.

Figure 10:
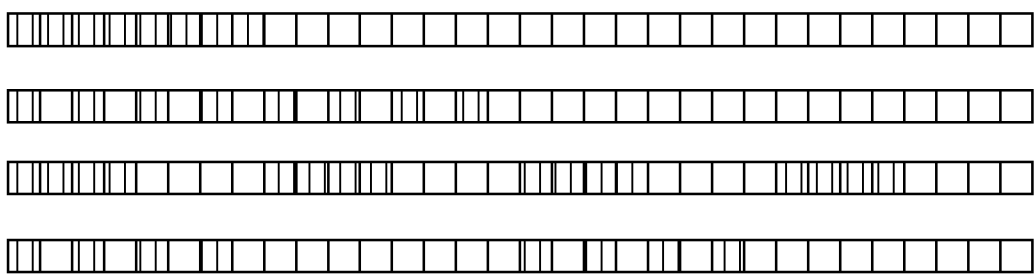
FIG. 10 is a schematic diagram of implementing codebook subset restriction based on a codeword group in an example of Embodiment six of the present disclosure.

In FIG. 10, a restricted code word group or basic vector group is represented by a blank grid, and a selected codeword group is represented by a grid with shadow.

Figure 11:
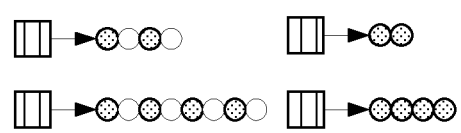
FIG. 11 is a schematic diagram of selection of indexes (or vector directions) of a base vector in an equally spaced manner when a same base vector group/codeword group includes a plurality of base vectors/codewords according to Embodiment six of the present disclosure.
Figure 12A:
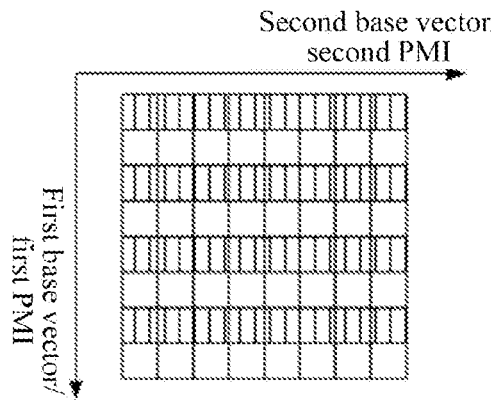
FIG. 12A to FIG. 12F are schematic diagrams of joint selection of codeword groups/base vector groups when a plurality of base vectors exist according to Embodiment six of the present disclosure.
Figure 12B:
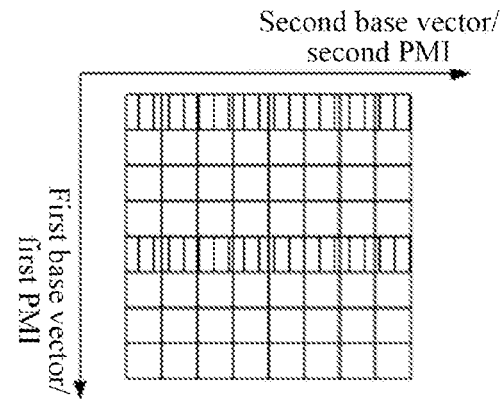
Figure 12C:
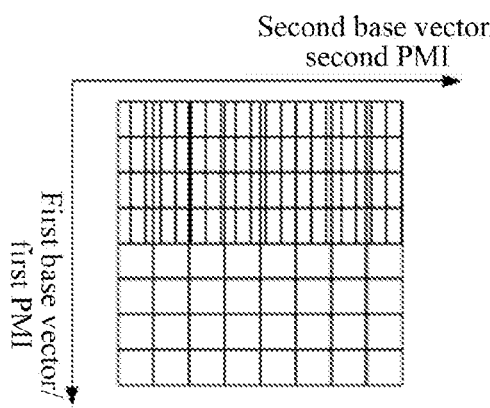
Figure 12D:
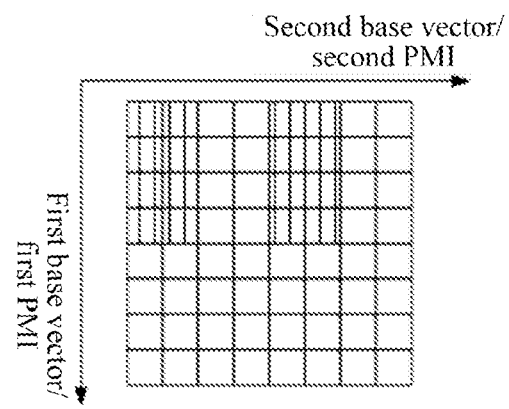
Figure 12E:
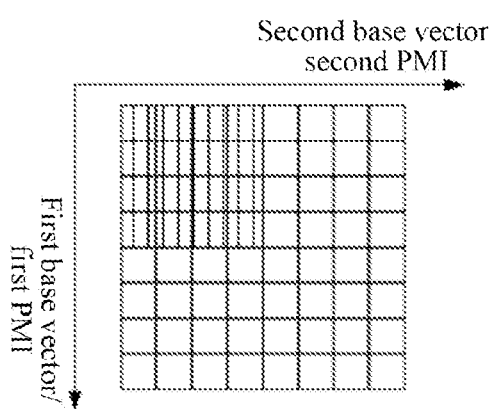
Figure 12F:
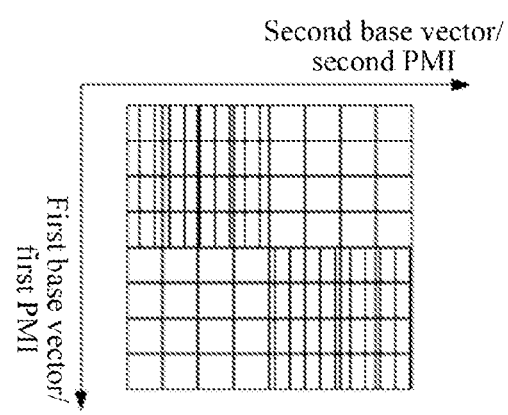

As shown in FIG. 11, the selected codeword or base vector (or the restricted, i.e., not selected, codeword or base vector) has the following characteristics: within a same codeword group, when the plurality of codewords are included, codeword indexes are selected at equal spacings, which may be the power of 2 or an integer multiple of $O_1$. Within a same base vector group, when the plurality of base vectors are included, indexes of the base vectors (or vector directions) are selected at equal spacings. Continuous configurations are considered a special case of configurations at equal spacings.

The selected base vector group or codeword group may be configured in a manner of a bitmap, for example, 1 represents the selected codeword group or base vector group, and 0 represents the restricted codeword group or base vector group. In an embodiment, the selected codeword group or base vector group needs to satisfy a rule of being equally spaced. An example is given by a and b in the following table, where each codeword group or base vector group includes four codewords or base vectors.

| a | 1 | 1 | 1 | 1 | 0 | 0 | 0 | 0 | 0 | 0 | 0 | 0 | 0 | 0 | 0 | 0 |
| b | 1 | 0 | 1 | 0 | 0 | 0 | 0 | 0 | 0 | 0 | 0 | 0 | 0 | 0 | 0 | 0 |

If a codeword group is considered to include one codeword, signaling in the manner of a bitmap is adopted to indicate the selected codeword, and a configuration in the following table may occur. The configuration is characterized in that the signaling may be divided into a plurality of segments (one segment includes four codewords), and within a segment having the selected codewords, the selected codewords are equally spaced. In an embodiment, segments having the selected codewords are also equally spaced.

| | | | | | | | | | | | | | | | | |
|---|---|---|---|---|---|---|---|---|---|---|---|---|---|---|---|---|
| A | 1 | 1 | 1 | 1 | 0 | 0 | 0 | 0 | 0 | 0 | 0 | 0 | 1 | 1 | 1 | 1 |
| B | 1 | 0 | 1 | 0 | 0 | 0 | 0 | 0 | 0 | 0 | 0 | 0 | 1 | 0 | 1 | 0 |
| C | 1 | 0 | 1 | 0 | 1 | 0 | 1 | 0 | 1 | 0 | 1 | 0 | 1 | 0 | 1 | 0 |
| D | 1 | 1 | 0 | 0 | 1 | 1 | 0 | 0 | 1 | 1 | 0 | 0 | 1 | 1 | 0 | 0 |
| E | 1 | 0 | 0 | 0 | 1 | 0 | 0 | 0 | 1 | 0 | 0 | 0 | 1 | 0 | 0 | 0 |

The case in which codeword groups or base vector groups are jointly selected when the plurality of base vectors exist is given in FIG. 10. It is assumed that bitmap signaling is adopted, and when each bit corresponds to one codeword group, a two-dimensional form may first be changed into a one-dimensional form, for example, the numbers of rows and columns of a matrix are readjusted through a reshape function. At the moment, the selected group may also be divided into a plurality of segments, with equal spacings within a segment and equal spacings between the segments.

Embodiment Seven

The embodiment describes codebook configurations of different uplink feedback manners.

The same codebook configuration parameters are used for different uplink feedback manners in the related art. But considering characteristics of overhead and robustness of different feedback manners, in practice, the codebook configuration parameters may be respectively configured for different uplink feedback manners.

In an embodiment, $N_1$, $N_2$, $O_1$, and $O_2$ are configured for different uplink feedback manners, respectively. CSR signaling may also be configured for a plurality of uplink feedback manners, respectively, where the CSR signaling carries value range selection information of a base vector or value range selection information of a codeword.

It should be noted that, in addition to independent configurations, the PUCCH and the PUSCH may perform a codebook-related configuration for the PUSCH, and the PUCCH performs a further configuration based on a codebook of the PUSCH. That is, the PUSCH can determine the codebook according to first-class codebook configuration signaling, but the PUCCH needs to determine the codebook according to the first-class codebook configuration signaling or according to the first-class codebook configuration signaling and a second-class codebook configuration signaling.

The different feedback manners may be used for two different channels of PUCCH and PUSCH. In addition, different feedback manners may also be as follows:
- having different PUCCH transmission formats, such as PUCCH transmission format 1 and PUCCH transmission format 2;
- having different PUCCH content formats, such as PUCCH content format 1 and PUCCH content format 2;
- having different PUSCH feedback modes, such as PUSCH feedback mode 1, PUSCH feedback mode 2; and
- having different CSI feedback carriers, such as CSI feedback carrier 1 and CSI feedback carrier 2.

A codebook configuration method of a PUCCH is further provided in the embodiment.

The number of transmission bits on the PUCCH is special, and the number of available bits of CSI may be changed due to the need to transmit different content simultaneously. For example, a PMI overhead allowed for transmission of the PMI alone may differ from a PMI overhead allowed for transmission of the PMI along with the CRI and the RI. In this case, if a codebook configuration is performing for each case, the codebook configuration will be complicated and a signaling overhead will be wasted. A codebook generation method capable of performing overhead self-adaption is provided in the embodiment.

It is assumed that a configuration parameter includes dimension parameters N1 and N2, codeword/base vector range indication parameters, and density parameters O1 and O2, and phase rotation parameters may be agreed on or configured.

If a codebook is generated according to these parameters, the codebook size is $2^{L1}$, whereas the actual overhead is only L2 bits. Then the codebook that should be used for the PUCCH needs to be codeword compressed according to an agreed or configured sampling rule. Examples are as follows.

Rule 1: If $O_1$ is equal to $O_2$ and is greater than or equal to 4, $O_1$ is preferentially reduced to ½ of an original value, if still not enough, $O_2$ is reduced to ½ of an original value, if still not enough, $O_1$ is reduced to ¼ of the original value, if still not enough, $O_2$ is reduced to ¼ of the original value, and if not enough, the number of rotation phases is reduced to ½ of the original number.

Rule 2: If $O_1$ is greater than $O_2$, $O_1$ is greater than 4, and $O_2$ is greater than or equal to 4, $O_1$ is preferentially reduced to ½ of an original value, if still not enough, $O_1$ is reduced to ¼ of the original value, if still not enough, $O_2$ is reduced to ½ of an original value, if still not enough, $O_2$ is reduced to ¼ of the original value, and if not enough, the number of rotation phases is reduced to ½ of the original number.

Rule 3: If the number of values of phase rotation is greater than or equal to 4, the number of rotation phases are preferentially reduced to ½ of the original number, if not enough, $O_1$ is reduced to ½ of an original value, if still not enough, $O_1$ is reduced to ¼ of the original value, and if still not enough, $O_2$ is reduced to ½ of an original value.

The selection of rules requires consideration of magnitudes of $O_1$ and $O_2$ and the number of phase selections.

Selection considerations of different rank rules are different and selection considerations of different codebook dimension rules are also different.

A sampling rule may be configured by a base station or may be agreed on between the base station and a terminal.

Embodiment Eight

A base vector may be pre-acted on a plurality of antennas to form a plurality of ports. A port configuration method is provided in the embodiment.

Figure 13:
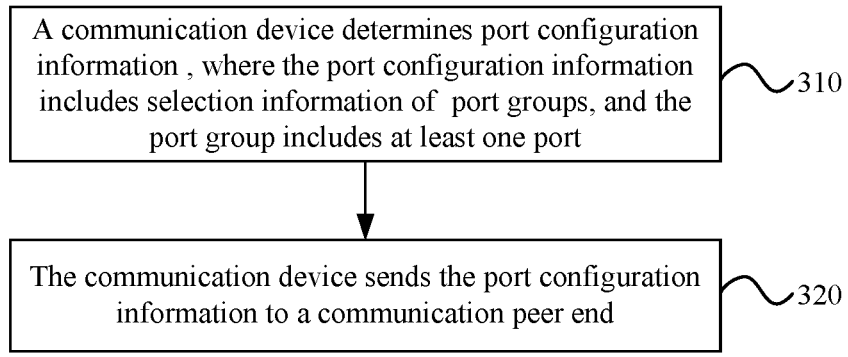
FIG. 13 is a flowchart of a port configuration method according to Embodiment eight of the present disclosure.

As shown in FIG. 13, the method of the embodiment includes steps 310 and 320.

In step 310, a communication device determines port configuration information. The port configuration information includes selection information of port groups. The port group includes at least one port. When the number of selected port groups is greater than 1, the port groups are selected in an equally spaced manner.

A spacing between the port groups may be characterized by the interval between first ports in different port groups. Other spacing definition methods may also be used.

In step 320, the communication device sends the port configuration information to a communication peer end.

In the embodiment, the communication device determines the port configuration information as follows: the communication device configures selection information of the port group in at least one of the following manners.

The selection information of the port group is configured for various rank groups or layer groups, respectively.

The selection information of the port group is configured for various feedback manners, respectively.

The selection information of the port group is configured for various antenna groups, respectively.

The selection information of the port group is configured for various measurement reference resource sets, respectively.

In the embodiment, the selection information of the port group is represented by value range information of a port group index. The value range information of the port group index includes at least one of the following information of the port group index: a starting position, an ending position, the number of values and a selection rule.

In the embodiment, the port group includes a plurality of ports, and the plurality of ports are selected in an equally spaced manner.

A selection method of a base vector group in the foregoing embodiments may also be used for the selection of the port group. For example, in another embodiment, the selection information of the port group is configured in a manner of a bitmap. Each bit in the bitmap corresponds to one port group, and the port group includes at least one base vector. A first state of each bit in the bitmap represents that a port group corresponding to the bit is selected, a second state represents that the port group corresponding to the bit is not selected, and any two adjacent bits in the first state are spaced apart by the same number of bits in the second state.

A port configuration device is further provided in the embodiment and includes a determining module and a sending module.

The determining module is configured to determine port configuration information. The port configuration information includes selection information of port groups. The port group includes at least one port. when the number of selected port groups is greater than 1, the port groups are selected in an equally spaced manner.

The sending module is configured to send the port configuration information to a communication peer end.

In the embodiment, the determining module is configured to determine the port configuration information by performing a following operation: configuring the selection information of the port group in at least one of the following manners.

The selection information of the port group is configured for various rank groups or layer groups, respectively.

The selection information of the port group is configured for various feedback manners, respectively.

The selection information of the port group is configured for various antenna groups, respectively.

The selection information of the port group is configured for various measurement reference resource sets, respectively.

A communication device is further provided in the embodiment of the present disclosure and includes a memory, a processor, and a computer program stored in the memory and executable on the processor. When the processor executes the computer program, the processor implements the following steps.

Port configuration information is determined. The port configuration information includes selection information of port groups. The port group includes at least one port. When the number of selected port groups is greater than 1, the port groups are selected in an equally spaced manner.

The port configuration information is sent to a communication peer end.

A computer readable storage medium is further provided in the embodiment of the present disclosure, and is configured to store a computer program, where when a processor executes the computer program, the following steps are implemented.

Port configuration information is determined. The port configuration information includes selection information of port groups. The port group includes at least one port. When the number of selected port groups is greater than 1, the port groups are selected in an equally spaced manner.

The port configuration information is sent to a communication peer end.

In the embodiment, the selection information of the port group is configured in at least one of the following manners.

The selection information of the port group is configured for various rank groups or layer groups, respectively.

The selection information of the port group is configured for various feedback manners, respectively.

The selection information of the port group is configured for various antenna groups, respectively.

The selection information of the port group is configured for various measurement reference resource sets, respectively.

In the embodiment, the selection information of the port is represented by value range information of a port group index. The value range information of the port group index includes at least one of the following information of the port group index: a starting position, an ending position, the number of values and a selection rule.

In the embodiment, the port group includes a plurality of ports, and the plurality of ports are selected in an equally spaced manner.

The embodiment can achieve an effect similar to that of the foregoing embodiment.

An example of the embodiment is given as below.

It is assumed that eight values of base vectors correspond to eight directions, and these base vectors act on an antenna element to form eight ports, which are ports 0~7, respectively.

Figure 14:
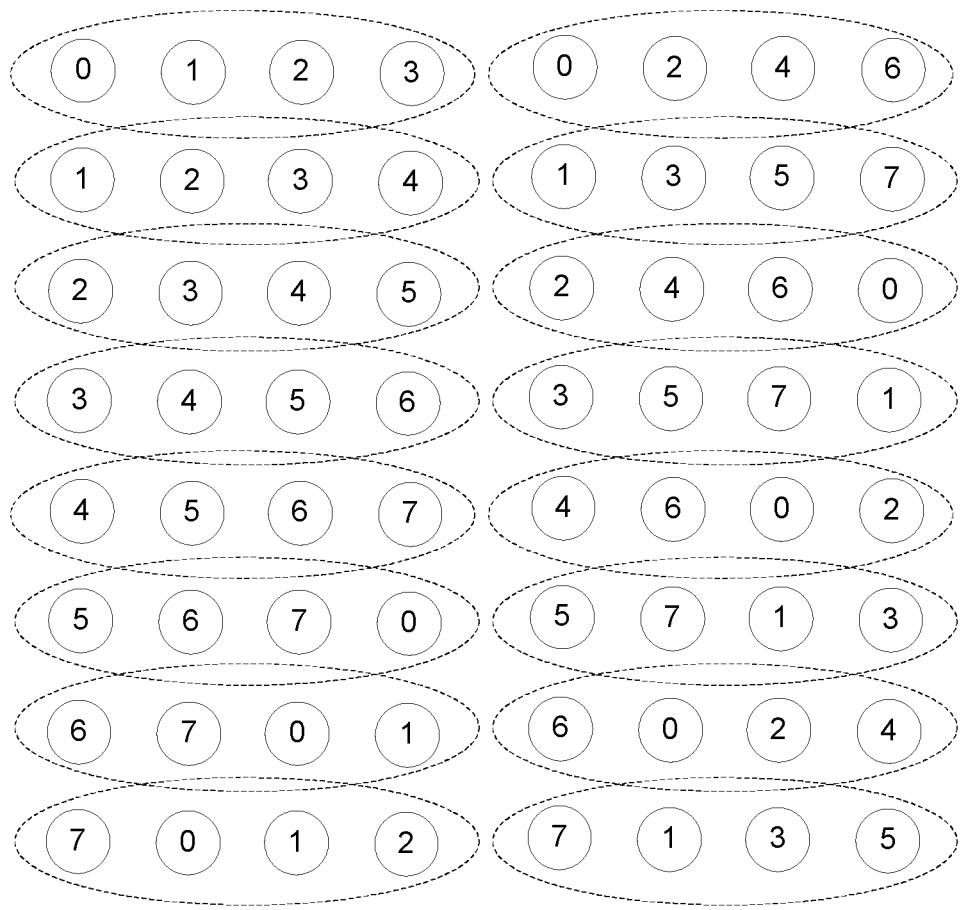
FIG. 14 is a schematic diagram of a port group in an example of Embodiment eight of the present disclosure.

A base station may restrict or select port groups. Herein, the ports included in a port group may be selected in an equally spaced manner. For example, when a group includes four ports, some port groups as shown in FIG. 14 may exist.

The base station may restrict or select these groups, and configure port selection information to a terminal.

When the number of selected port groups is greater than 1, the port groups are selected in an equally spaced manner.

For example, a port group {0, 1, 2, 3}, a port group {1, 2, 3, 4}, a port group {2, 3, 4, 5} and a port group {3, 4, 5, 6} may be selected at the same time; but the port group {0, 1, 2, 3}, the port group {1, 2, 3, 4} and a port group {4, 5, 6, 7} which are not equally spaced cannot be selected at the same time.

For example, the port group {0, 1, 2, 3}, the port group {2, 3, 4, 5}, the port group {4, 5, 6, 7} and a port group {6, 7, 8, 9} may be selected at the same time; but the port group {0, 1, 2, 3}, the port group {3, 4, 5, 6}, the port group {4, 5, 6, 7} and a port group {7, 8, 9, 10} which are not equally spaced cannot be selected at the same time.

For example, a port group {0, 1}, a port group {2, 3}, a port group {4, 5} and a port group {6, 7} may be selected at the same time; but the port group {0, 1}, a port group {3, 4}, the port group {6, 7} and a port group {9, 10} which are not equally spaced cannot be selected at the same time.

The base station may further configure selection spacing parameter information of the port group to the terminal.

The base station may further configure a starting position of the selection of the port group to the terminal.

The base station may further configure an ending position of the selection of the port group to the terminal.

The base station may further configure the number of selection of the port groups to the terminal.

The terminal may perform selection based on the port groups configured by the base station, and report information of the port groups or information of ports in the port groups.

If the port group includes one port, the base station configures available port groups, and the terminal selects the ports, with the selected ports being adjacent or equally spaced.

It should be noted that, when it is mentioned in the embodiment and the above-mentioned embodiments that the selection is performed at equal spacings, a value k and k mod R are equivalent, and R is the maximum selection value of the base vector group or the codeword group or the port group, where the value k refers to a distance between the spacings. For example, when R=9, the difference between 0 and 7 may be 7 or 1, where 1 is obtained by regarding 0 as 8, and the difference (spacing) between the two values is determined by the smaller value, i.e., 1.

Embodiment Nine

The embodiment relates to a method and device for implementing a codebook fast configuration.

In the related art, after a codebook is configured to a UE, the codebook does not changed within a long time, unless a re-configuration of layer-3 signaling is initiated. The codebook includes codewords corresponding to various directions, and even if a terminal moves, an impact on performance is not significant. Solutions proposed in the foregoing embodiments can save the overhead and reduce the complexity. However, if the terminal moves, the codebook needs to be changed correspondingly, and the change is still gradual. A dynamic codebook parameter signaling configuration method is provided in the embodiment of the present disclosure. The method can dynamically change codebook parameters in the physical layer or media access control (MAC) layer configuration signaling, and range parameters of a codeword or base vector and density parameters of the base vector are mainly sent.

Figure 15:
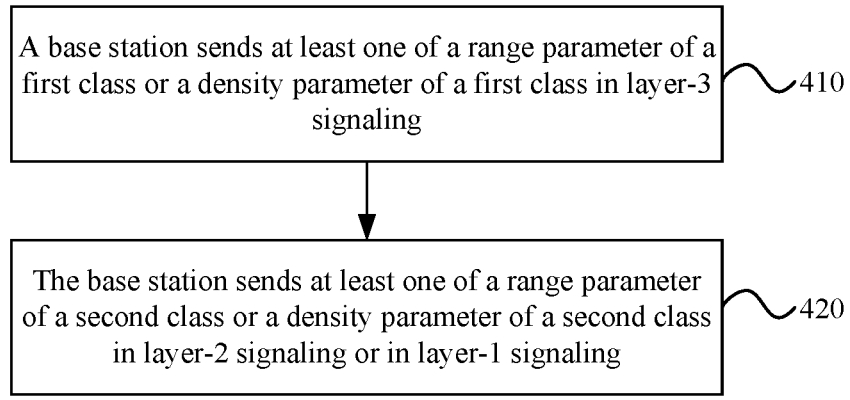
FIG. 15 is a flowchart of a codebook configuration method on a base station side according to Embodiment nine of the present disclosure.

As shown in FIG. 15, a codebook configuration method on a base station side provided in the embodiment includes steps 410 and 420.

In step 410, a base station sends, in layer-3 signaling, at least one of a range parameter of a first class or a density parameter of a first class to a terminal.

In step 420, the base station sends, in layer-2 signaling or in layer-1 signaling, at least one of a range parameter of a second class or a density parameter of a second class to the terminal.

The processing of the above two steps is not limited by the preceding sequence.

Figure 16:
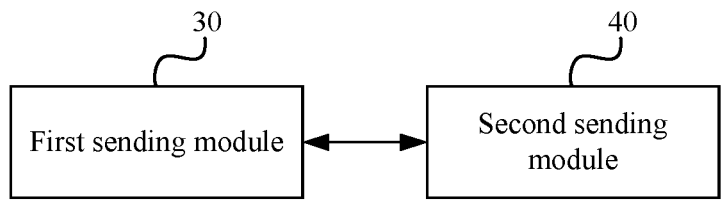
FIG. 16 is a block diagram of a codebook configuration device on a base station side according to Embodiment nine of the present disclosure.

As shown in FIG. 16, a codebook configuration device is further provided in the embodiment and includes a first sending module 30 and a second sending module 40.

The first sending module 30 is configured to send, in layer-3 signaling, at least one of a range parameter of a first class or a density parameter of a first class to a terminal.

The second sending module 40 is configured to send, in layer-2 signaling or in layer-1 signaling, at least one of a range parameter of a second class or a density parameter of a second class to the terminal.

The range parameter is used for indicating at least one of value range selection information of a base vector in a construction model of a codebook or value range selection information of a codeword; and the density parameter is used for indicating a density of the base vector.

In the embodiment, the range parameter of the second class includes at least one of a biasing parameter of a starting position or a biasing parameter of a density.

Figure 17:
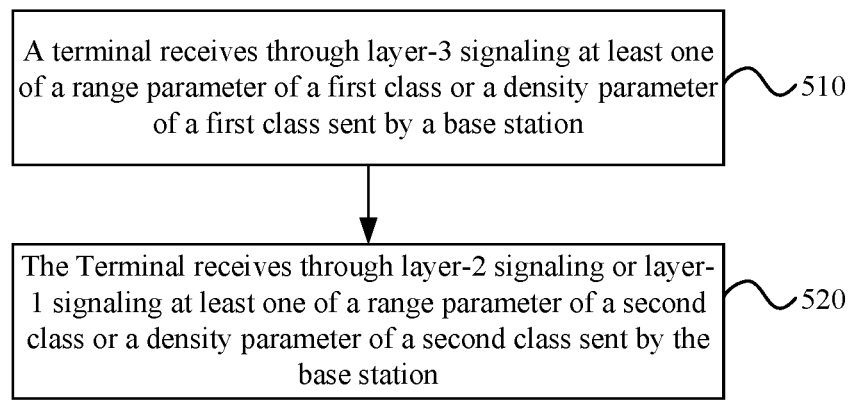
FIG. 17 is a flowchart of a codebook configuration method on a terminal side according to Embodiment nine of the present disclosure.

As shown in FIG. 17, a codebook configuration method on a terminal side provided in the embodiment includes steps 510 and 520.

In step 510, a terminal receives, through layer-3 signaling, at least one of a range parameter of a first class or a density parameter of a first class sent by a base station.

In step 520, the terminal receives, through layer-2 signaling or layer-1 signaling, at least one of a range parameter of a second class or a density parameter of a second class sent by the base station.

The processing of the above two steps is not limited by the preceding sequence

As shown in FIG. 18, a codebook configuration device is further provided in the embodiment and includes a first receiving module 50 and a second receiving module 60.

The first receiving module 50 is configured to receive, in layer-3 signaling, at least one of a range parameter of a first class or a density parameter of a first class sent by a base station.

The second receiving module 60 is configured to receive, in layer-2 signaling or in layer-1 signaling, at least one of a range parameter of a second class or a density parameter of a second class sent by the base station.

The range parameter is used for indicating at least one of value range selection information of a base vector in a construction model of a codebook or value range selection information of a codeword; and the density parameter is used for indicating a density of the base vector.

In the embodiment, the range parameter of the second class includes at least one of a biasing parameter of a starting position or a biasing parameter of a density.

After a terminal performs reception, at least one of a selection range of the base vector or a selection range of the codeword may be determined according to the range parameter of the first class and the range parameter of the second class, and a density of the base vector is determined according to the density parameter of the first class and the density parameter of the second class. FIG. 19 is a schematic diagram of an example of the embodiment. L3 refers to a radio resource control (RRC) layer and an upper layer, an L2 layer refers to a MAC layer, and an L1 layer refers to a PHY layer, i.e, a physical layer.

Embodiment Ten

A measuring and reporting method is provided in the embodiment and includes steps described below.

A terminal measures and reports channel state information (CSI) according to codebook subset restriction (CSR), where the CSI includes a first precoding matrix indicator (PMI) and a second PMI.

In the embodiment, the step in which the terminal measures and reports the CSI according to the CSR includes: when a precoding matrix indicated jointly by the first PMI and the second PMI is restricted by the CSR, the terminal reports a mapping relationship between the second PMI and a precoding matrix indicated by the second PMI, where the mapping relationship is determined according to a restricted first PMI and a restricted second PMI.

In the embodiment, the step in which the terminal measures and reports the CSI according to the CSR includes: the terminal removes a precoding matrix indicated jointly by the restricted first PMI and the restricted second PMI from a precoding matrix set included in the first PMI, recodes a remaining precoding matrix in the precoding matrix set, and reports the second PMI.

In the embodiment, the terminal measures and reports the CSI according to the CSR, and the first PMI includes a first-class codebook index and a second-class codebook index; and the first PMI or the second PMI includes at least one of a relative power indicator (RPI) or a phase indicator (PI) corresponding to the second-class codebook index.

The codebook configuration method in the embodiment includes at least one of the following characteristics.

The first-class codebook index is not associated with at least one of the RPI or the PI.

The RPI corresponding to the second-class codebook index is used for indicating a power change of a precoding vector indicated by the second-class codebook index relative to a precoding vector indicated by the first-class codebook index.

The PI corresponding to the second-class codebook index is used for indicating a phase shift of the precoding vector indicated by the second-class codebook index relative to the precoding vector indicated by the first-class codebook index.

In the embodiment, when a precoding matrix indicated by the first-class codebook index is restricted by the CSR, the terminal reports the CSI in at least one of the following manners.

The terminal does not report a group of PMIs corresponding to the first-class codebook index.

The terminal does not report the first-class codebook index as the first-class codebook index.

In the embodiment, when the terminal does not report the group of PMIs corresponding to the first-class codebook index, the method further includes at least one of the following.

The group of PMIs includes a PMI corresponding to a precoding vector that is orthogonal to a precoding vector indicated by the first-class codebook index; and the group of PMIs is decided by base station indication signaling, where the base station indication signaling includes parameters N1 and N2 indicating a precoding dimension.

The terminal updates, according to the restricted first-class codebook index, a mapping relationship between a PMI and a precoding matrix indicated by the PMI, the terminal removes a precoding matrix corresponding to a group of PMIs of the restricted first-class codebook index from a precoding matrix set included in a codebook, and recodes a remaining precoding matrix in the precoding matrix set and reports the PMI.

In the embodiment, the terminal does not report the first-class codebook index as the first-class codebook index, and the method further includes: the terminal reports the first-class codebook index as the second-class codebook index, and sets a corresponding RPI to be 0.

In the embodiment, when a precoding matrix indicated by the second-class codebook index is restricted by the CSR, the terminal reports the CSI in at least one of the following manners.

The terminal sets an RPI of the second-class codebook index to 0.

The terminal sets the RPI of the second-class codebook index to 0 and the PI corresponding to the second-class codebook index to a fixed value.

The terminal sets the RPI of the second-class codebook index to 0, and does not report the PI corresponding to the second-class codebook index.

The terminal sets a broadband RPI of the second-class codebook index to 0.

The terminal sets the broadband RPI of the second-class codebook index to 0 and at least one of a sub-band RPI or PI corresponding to the second-class codebook index to be in a fixed state.

The terminal sets the broadband RPI of the second-class codebook index to 0 and does not report at least one of the sub-band RPI or PI corresponding to the second-class codebook index.

The terminal does not report the second-class codebook index or at least one of the RPI or the PI corresponding to the second-class codebook index.

In the embodiment, when the terminal does not report the second-class codebook index or at least one of the RPI or the PI corresponding to the second-class codebook index, the terminal updates, according to a restricted second-class codebook index, a mapping relationship between a PMI and a precoding matrix indicated by the PMI, and the terminal removes a precoding matrix indicated by the restricted second-class codebook index from a precoding matrix set included in a codebook, recodes a remaining precoding matrix in the precoding matrix set, and reports the PMI.

Embodiment Eleven

An example of a codebook of Type II is mentioned above, where $(k_1, k_2)$ represents different components of a first-class precoding matrix indicator (PMI), including a horizontal direction PMI and a vertical direction PMI, $(m_1, m_2)$ represents different components of a second-class PMI, including a horizontal direction PMI and a vertical direction PMI of the second-class PMI, p represents RPI information corresponding to the second-class PMI, and $(q_2, q_3)$ represents different components of PI information corresponding to the second-class PMI, including a first polarization direction PI and a second polarization direction PI.

When codebook subset restriction or codeword selection is performed, the second-class PMI $(m_1, m_2)$ may be selected in a plurality of manners.

Manner one: For $(m_1, m_2)$, a restricted orthogonal beam is selected.

That is, the selected orthogonal beam is restricted by some configurations, such as restriction of a codebook dimension, and a restriction manner is provided in the following table.

| N₁≥N₂, N₁≥4, N₂≠1 | | N₁=3, N₂=2 | | N₁=2, N₂=2 | | N₂>N₁, N₂≥4, N₁≠1 | | N₂=3, N₁=2 | | N₁≥8, N₂=1 | | N₁=2, N₂=1 | | N₁=4, N₂=1 | |
|---|---|---|---|---|---|---|---|---|---|---|---|---|---|---|---|
| m₁ | m₂ | m₁ | m₂ | m₁ | m₂ | m₁ | m₂ | m₁ | m₂ | m₁ | m₂ | m₁ | m₂ | m₁ | m₂ |
| 1 | 0 | 1 | 0 | 1 | 0 | 0 | 1 | 0 | 1 | 1 | 0 | 1 | 0 | 1 | 0 |
| 2 | 0 | 2 | 0 | 0 | 1 | 0 | 2 | 0 | 2 | 2 | 0 |   |   | 2 | 0 |
| 3 | 0 | 0 | 1 | 1 | 1 | 0 | 3 | 1 | 0 | 3 | 0 |   |   | 3 | 0 |
| 0 | 1 | 1 | 1 |   |   | 1 | 0 | 1 | 1 | 4 | 0 |   |   |   |   |
| 1 | 1 | 2 | 1 |   |   | 1 | 1 | 1 | 2 | 5 | 0 |   |   |   |   |
| 2 | 1 |   |   |   |   | 1 | 2 |   |   | 6 | 0 |   |   |   |   |
| 3 | 1 |   |   |   |   | 1 | 3 |   |   | 7 | 0 |   |   |   |   |

A manner of selecting the second-class PMI given in the above table is for selecting the second-class PMI in the manner shown in FIG. 20 when a total number of ports is greater than or equal to 16. In the figure, a black grid represents the first-class PMI, and a blank format represents the second-class PMI.

Manner two: For (m₁, m₂) an unrestricted orthogonal beam is selected.

That is, a second-class codebook index selected by a terminal is a codebook index corresponding to the best precoding among all precoding vectors orthogonal to precoding indicated by a first-class codebook index.

If the first-class codebook index calculated by the terminal is restricted by a beam indicated by the CSR, the terminal may report the CSI in two manners.

One manner is as follows: all beam groups that are orthogonal to the first-class codebook index or beam groups restricted by Manner one cannot be selected.

In an embodiment, a mapping relationship between a precoding matrix and a PMI may be changed using a first-class codebook index restricted by the CSR. For example, after a precoding matrix corresponding to a group of PMIs which is restricted by the codebook index is removed, a remaining precoding matrix in the precoding matrix set is recoded and the PMI is reported, so that the feedback overhead of CSI can be reduced.

The other manner is as follows: the codebook index cannot be reported as the first-class codebook index, that is, when the terminal selects the first-class codebook index, the codebook index is jumped, but may be reported as a second-class orthogonal beam, and follows restriction of reporting the second-class orthogonal beam.

If the second-class codebook index calculated by the terminal is restricted by a beam indicated by the CSR, the terminal may report the CSI in the following manners.

The terminal sets an RPI of the second-class codebook index to 0, and reports the second-class codebook index and the PI corresponding to the second-class codebook index.

The terminal sets the RPI of the second-class codebook index to 0, reports the second-class codebook index, and does not report the PI corresponding to the second-class codebook index.

When the RPI of the second-class codebook index fed back by the terminal corresponds to a broadband RPI and a sub-band RPI, the terminal sets the broadband RPI of the second-class codebook index to 0 and reports at least one of the sub-band RPI or PI corresponding to the second-class codebook index.

When the RPI of the second-class codebook index fed back by the terminal corresponds to the broadband RPI and the sub-band RPI, the terminal sets the broadband RPI of the second-class codebook index to 0 and does not report at least one of the sub-band RPI or PI corresponding to the second-class codebook index.

The terminal does not report the codebook index, that is, when a second-class codebook index is selected, the terminal jumps the precoding matrix corresponding to the codebook index, and the codebook index cannot be reported. In an embodiment, the terminal updates, according to a restricted second-class codebook index, a mapping relationship between a PMI and a precoding matrix indicated by the PMI. For example, the terminal removes a precoding matrix indicated by the restricted second-class codebook index from a precoding matrix set included in a codebook, recodes a remaining precoding matrix in the precoding matrix set, and reports the PMI, so that the feedback overhead of CSI can be reduced.

The above manners may also be used in a Type I codebook. In the Type I codebook, a design instance is as follows: the first PMI indicates a group of beams, where the number of beams is greater than 1, and the selected beams in the beam group are indicated by the second PMI. In an embodiment, the final beam is indicated jointly by the first PMI and the second PMI, and the CSR restricts a precoding matrix indicated jointly by the first PMI and the second PMI. At the moment, when some beams in a group of beams indicated by the first PMI are restricted by the CSR, these beams may not be selected when the terminal selects the second PMI. Thus, these beams are removed, and a remaining precoding matrix in the precoding matrix set included in the first PMI is recoded and the second PMI is reported, so that the feedback overhead of CSI can be reduced.

A comparison table for English acronyms of the present application is given below.

| Acronym | Full Name |
|---|---|
| CSI | Channel State Information |
| NR | New Radio Access |
| 3GPP | The third generation partnership project |
| MIMO | Multiple input multiple output |
| UE | User equipment |
| CSI-RS | CSI Reference Signal |
| MAC | Media access control |
| PHY-layer | Physical layer |
| LTE | Long Term Evolution |
| PMI | Precoding matrix indicator |
| RI | Rank indicator |
| CQI | Channel quality indicator |
| RPI | Relative power indicator |
| PI | Phase indicator |
| PUCCH | Physical uplink control channel |
| PUSCH | Physical shared control channel |
| RRC | Radio Resource Control |
| DCI | Downlink control information |

| Acronym | Full Name |
| --- | --- |
| DFT | Discrete Fourier Transform |
| CSR | Codebook subset restriction |
| SRS | Sounding reference signal |
| CSI-RS | CSI reference resource |

It should be understood by those skilled in the art that functional modules/units in all or part of the steps of the method, the system and the device disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be implemented jointly by several physical components. Some or all components may be implemented as software executed by processors such as central processing units, digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). A term computer storage medium includes volatile and nonvolatile, removable and non-removable media implemented in any method or technology for storage of information (such as computer-readable instructions, data structures, program modules or other data). The computer-storage medium includes, but is not limited to, a random access memory (RAM), a read only memory (ROM), an electrically erasable programmable read-only memory (EEPROM), a flash memory, or another memory technology, a compact disc read-only memory (CD-ROM), a digital versatile disc (DVD) or another optical disc storage, a magnetic cassette, a magnetic tape, disk storage or another magnetic storage device, or any other medium used to store the desired information and accessible by a computer. In addition, as is known to those skilled in the art, the communication medium generally includes computer-readable instructions, data structures, program modules or other data in modulated data signals such as carriers or other transmission mechanisms, and may include any information delivery medium.

What is claimed is:

1. A codebook configuration method, comprising:
   determining, by a communication device, configuration information of a codebook, wherein the configuration information of the codebook comprises at least one of value range selection information of a base vector in a construction model of the codebook or value range selection information of a codeword in the codebook; and
   sending, by the communication device, the configuration information of the codebook to a communication peer end,
   wherein the determining, by a communication device, configuration information of a codebook comprises:
   configuring, by the communication device, the value range selection information of the base vector or the value range selection information of the codeword in at least one of following manners:
   configuring the value range selection information of the base vector or the value range selection information of the codeword for various rank groups or layer groups, respectively;
   configuring the value range selection information of the base vector or the value range selection information of the codeword for various feedback manners, respectively;
   configuring the value range selection information of the base vector or the value range selection information of the codeword for various antenna groups, respectively; or
   configuring the value range selection information of the base vector or the value range selection information of the codeword for various measurement reference signal sets, respectively;
   wherein the value range selection information of the base vector comprises value range selection information configured for a plurality of sub-ranges.

2. The method of claim 1, wherein the configuration information of the codebook comprises at least one of configuration information of a codebook generation parameter or configuration information of a codebook subset restriction parameter.

3. The method of claim 1, wherein the value range selection information of the base vector comprises value range information of part or all of base vector parameters related to the base vector, wherein the value range information comprises at least one of:
   a starting position;
   an ending position;
   a number of values; or
   a selection rule.

4. The method of claim 1,
   wherein the value range selection information of the base vector is configured in a manner of a bitmap, wherein each bit in the bitmap corresponds to a base vector group, and the base vector group comprises at least one base vector; and
   wherein a first state of each bit in the bitmap represents that the base vector group corresponding to the bit is selected, a second state represents that the base vector group corresponding to the bit is not selected, and any two adjacent bits in the first state are spaced apart by a same number of bits in the second state.

5. The method of claim 1, wherein a value range determined by the value range selection information of the base vector comprises at least one sub-range, and a difference between any adjacent values is equal in all sub-ranges.

6. The method of claim 1, wherein the value range selection information of the codeword is represented by value range information of a codeword index, and the value range information of the codeword index comprises at least one of following information of the codeword index:
   a starting position;
   an ending position;
   a number of values; or
   a selection rule.

7. The method of claim 1,
   wherein the value range selection information of the codeword is configured in a manner of a bitmap, wherein each bit in the bitmap corresponds to a codeword group or a codeword index value group, the codeword group comprises at least one codeword, and the codeword index value group comprises at least one codeword index value; and wherein a first state of each bit in the bitmap represents that the codeword group or the codeword index value group corresponding to the bit is selected, a second state represents that the codeword group or the codeword index value group corresponding to the bit is not selected, and any two adjacent bits in the first state are spaced apart by a same number of bits in the second state.

8. A codebook configuration device, comprising a processor and a storage device, wherein the storage device stores processor-executable programs, and the programs comprise:
a determining module configured to determine configuration information of a codebook, wherein the configuration information of the codebook comprises at least one of value range selection information of a base vector in a construction model of the codebook or value range selection information of a codeword in the codebook; and
a sending module configured to send the configuration information of the codebook to a communication peer end,
wherein the determining module is configured to determine the configuration information of the codebook by performing a following operation: configuring the value range selection information of the base vector or the value range selection information of the codeword in at least one of following manners:
configuring the value range selection information of the base vector or the value range selection information of the codeword for various rank groups or layer groups, respectively;
configuring the value range selection information of the base vector or the value range selection information of the codeword for various feedback manners, respectively;
configuring the value range selection information of the base vector or the value range selection information of the codeword for various antenna groups, respectively; or
configuring the value range selection information of the base vector or the value range selection information of the codeword for various measurement reference signal sets, respectively;
wherein the value range selection information of the base vector comprises value range selection information configured for a plurality of sub-ranges.

9. The device of claim 8, wherein the configuration information of the codebook comprises at least one of configuration information of a codebook generation parameter or configuration information of a codebook subset restriction parameter.

10. The device of claim 8, wherein the value range selection information of the base vector comprises value range information of part or all of base vector parameters related to the base vector, wherein the value range information comprises at least one of:
a starting position,
an ending position,
a number of values, or
a selection rule.

11. The device of claim 8, wherein the value range selection information of the base vector is configured in a manner of a bitmap, wherein each bit in the bitmap corresponds to a base vector group, and the base vector group comprises at least one base vector; and
wherein a first state of each bit in the bitmap represents that the base vector group corresponding to the bit is selected, a second state represents that the base vector group corresponding to the bit is not selected, and any two adjacent bits in the first state are spaced apart by a same number of bits in the second state.

12. The device of claim 8, wherein a value range determined by the value range selection information of the base vector comprises at least one sub-range, and a difference between any adjacent values is equal in all sub-ranges.

13. The device of claim 8, wherein the value range selection information of the codeword is represented by value range information of a codeword index, and the value range information of the codeword index comprises at least one of following information of the codeword index:
a starting position,
an ending position,
a number of values, or
a selection rule.

14. The device of claim 8, wherein the value range selection information of the codeword is configured in a manner of a bitmap, wherein each bit in the bitmap corresponds to a codeword group or a codeword index value group, the codeword group comprises at least one codeword, and the codeword index value group comprises at least one codeword index value; and
wherein a first state of each bit in the bitmap represents that the codeword group or the codeword index value group corresponding to the bit is selected, a second state represents that the codeword group or the codeword index value group corresponding to the bit is not selected, and any two adjacent bits in the first state are spaced apart by a same number of bits in the second state.

15. A non-transitory computer-readable storage medium storing a computer program, wherein when the computer program is executed by a processor, following steps are implemented:
determining configuration information of a codebook, wherein the configuration information of the codebook comprises at least one of value range selection information of a base vector in a construction model of the codebook or value range selection information of a codeword in the codebook; and
sending the configuration information of the codebook to a communication peer end,
wherein the determining configuration information of a codebook comprises: configuring, by the communication device, the value range selection information of the base vector or the value range selection information of the codeword in at least one of following manners:
configuring the value range selection information of the base vector or the value range selection information of the codeword for various rank groups or layer groups, respectively;
configuring the value range selection information of the base vector or the value range selection information of the codeword for various feedback manners, respectively;
configuring the value range selection information of the base vector or the value range selection information of the codeword for various antenna groups, respectively; or
configuring the value range selection information of the base vector or the value range selection information of the codeword for various measurement reference signal sets, respectively;

wherein the value range selection information of the base vector comprises value range selection information configured for a plurality of sub-ranges.

\* \* \* \* \*